United States Patent
Thorpe et al.

(10) Patent No.: US 8,438,471 B2
(45) Date of Patent: May 7, 2013

(54) SYSTEM FOR SPEEDING UP WEB SITE USE USING TASK WORKFLOW TEMPLATES FOR FILTRATION AND EXTRACTION

(76) Inventors: John R Thorpe, West Hartford, CT (US); Alistair D'Lougar Black, Los Gatos, CA (US)

( * ) Notice: Subject to any disclaimer, the term of this patent is extended or adjusted under 35 U.S.C. 154(b) by 718 days.

(21) Appl. No.: 12/460,064

(22) Filed: Jul. 13, 2009

(65) Prior Publication Data
US 2011/0010612 A1      Jan. 13, 2011

(51) Int. Cl.
*G06F 17/00*      (2006.01)
*G06F 9/46*      (2006.01)

(52) U.S. Cl.
USPC .......... 715/234; 715/230; 715/236; 715/239; 715/760; 718/100

(58) Field of Classification Search .................. 715/204, 715/234, 236, 239
See application file for complete search history.

(56) References Cited

U.S. PATENT DOCUMENTS

| | | | | |
|---|---|---|---|---|
| 6,026,433 A * | 2/2000 | D'Arlach et al. | ............. | 709/217 |
| 6,101,510 A | 8/2000 | Stone et al. | ................... | 707/513 |
| 6,545,691 B1 | 4/2003 | Vallejo | .......................... | 345/804 |
| 6,714,928 B1 * | 3/2004 | Calow | ................... | 1/1 |
| 6,928,429 B2 * | 8/2005 | Brunssen et al. | ..................... | 1/1 |
| 7,047,318 B1 * | 5/2006 | Svedloff | ....................... | 709/246 |
| 7,360,166 B1 * | 4/2008 | Krzanowski | .................. | 715/767 |
| 7,376,653 B2 | 5/2008 | Hart, III | .......................... | 707/10 |
| 7,392,293 B2 | 6/2008 | Leonik | .......................... | 709/217 |
| 7,512,877 B2 * | 3/2009 | Aoki | ............................ | 715/234 |
| 7,516,153 B2 | 4/2009 | Hackworth et al. | .......... | 707/102 |
| 7,519,902 B1 | 4/2009 | Kraft et al. | ..................... | 715/234 |
| 7,613,685 B2 * | 11/2009 | Jaepel et al. | .......................... | 1/1 |
| 7,694,294 B2 * | 4/2010 | Bukovec et al. | ............... | 717/173 |
| 7,949,658 B2 * | 5/2011 | Laird-McConnell et al. | | 707/731 |
| 7,949,944 B2 * | 5/2011 | Cottrille et al. | ............... | 715/234 |
| 8,365,082 B2 * | 1/2013 | Skirpa | ........................... | 715/760 |
| 2002/0103666 A1 * | 8/2002 | Hanai et al. | ....................... | 705/1 |

(Continued)

FOREIGN PATENT DOCUMENTS
WO      WO 92/071267      9/2002

OTHER PUBLICATIONS

PHP Simple HTML DOM Parser "Sourceforge", http://simplehtmldom.sourceforge.net, Jan. 5, 2009 pp. 1-2.*

*Primary Examiner* — Stephen Hong
*Assistant Examiner* — Mario M Velez-Lopez
(74) *Attorney, Agent, or Firm* — Ronald C. Fish

(57) ABSTRACT

A system for speeding up rendering of and interacting with one or more web pages to accomplish some task using the internet. In a system comprising one or more client computers which can be cell phones, laptops or desktop computers coupled in any way to the internet and a template server and other web servers coupled to the internet, a microbrowser under control of a task workflow template is executed either by a client computer or the template server. The task workflow templates are custom defined workflows which define one or more web pages which need to be accessed and the data from each web page that needs to be extracted. The data defined in the task workflow template (and only that data) is extracted by the microbrowser and displayed on the client computer. Faster rendering results. Interaction by filling in of forms and extraction of data from the web pages that result when the form data is sent to the web server allows accomplishing of tasks using the internet much faster, especially using cell phones.

9 Claims, 12 Drawing Sheets

U.S. PATENT DOCUMENTS

| | | |
|---|---|---|
| 2002/0143750 A1* | 10/2002 | Brunssen et al. ............... 707/3 |
| 2004/0153972 A1* | 8/2004 | Jaepel et al. ............... 715/530 |
| 2004/0261017 A1* | 12/2004 | Perry ............... 715/513 |
| 2005/0216342 A1 | 9/2005 | Ashbaugh ............... 705/14 |
| 2005/0273698 A1* | 12/2005 | Smith et al. ............... 715/511 |
| 2006/0059036 A1* | 3/2006 | Moese et al. ............... 705/10 |
| 2006/0253533 A1 | 11/2006 | Bursztein et al. ............... 709/204 |
| 2007/0079231 A1* | 4/2007 | Ahyh et al. ............... 715/511 |
| 2007/0094248 A1* | 4/2007 | McVeigh et al. ............... 707/4 |
| 2008/0040653 A1* | 2/2008 | Levine ............... 715/205 |
| 2008/0077478 A1 | 3/2008 | Kim ............... 705/10 |
| 2008/0086369 A1* | 4/2008 | Kiat et al. ............... 705/14 |
| 2009/0083704 A1* | 3/2009 | Floyd et al. ............... 717/110 |
| 2009/0249244 A1* | 10/2009 | Robinson et al. ............... 715/781 |
| 2010/0241990 A1* | 9/2010 | Gabriel et al. ............... 715/810 |
| 2011/0010612 A1* | 1/2011 | Thorpe et al. ............... 715/234 |
| 2012/0010995 A1* | 1/2012 | Skirpa et al. ............... 705/14.49 |

* cited by examiner

SOFTWARE LAYERS IN MODIFIED SMARTPHONE

SYSTEM FOR SPEEDING UP WEB SITE USE USING TASK WORKFLOW TEMPLATES FOR FILTRATION AND EXTRACTION

BACKGROUND OF THE INVENTION

Web pages on today's world wide web often include very complex structures which have text, forms, lists, javascripts, displayed links to other pages, displayed command buttons, graphic images such as photographs, animated flash presentations, links to video, etc. Often, a user will request a web page in order to obtain some information and try to accomplish something such as book a flight. This often involves having to sequence through multiple pages and having to wait for each page to render before whatever the user set out to do is actually accomplished. This can be a slow and annoying process even on a desktop computer with a fast internet connection. It can be extremely slow and impossible or next to impossible on a phone with web browsing capability because of the limitations of such phones and the fact that most web sites are not optimized for mobile devices.

For example, to book a flight on American Airlines, a user will direct his or her browser to the airline's home page www.americanairlines.com, and then wait for the entire home page to render. All the user really wants to do on the first page received is enter her departure airport, destination airport, departure data, return data, indicate desired time frames to depart and return and enter how many passengers are travelling. But in order to do that, the user has to wait for her phone or computer's browser to render the American Airlines graphic, a flash presentation at the top center of the page, text and links regarding fare sale alerts, text and links regarding news about American Airlines and offers they are making, a frequently asked questions link for password help, an input form to check gates and times, schedules and flight status notification for flights that may be carrying a passenger to be picked up, a link to a page to search by price and schedule, graphics and links for hotel specials, a fly-now, pay-later program, a 30% bonus to buy frequent flyer miles and a link to a DealFinder page offering exclusive offers and discounts, and many other links.

When the first page finally completes rendering, the user enters her departure and destination airports and dates and desired times in and gives a search command. That results in another page being requested which the user must wait for her browser to completely render. The page that comes back includes many of the same links and images that were on the first page, a text box which indicates what the search parameters were, a graphic that shows what stage she is in the six page process to book the flight (actually a seven page process because they do not count the home page as one of the pages), a modify search form, and list boxes indicating multiple flights to choose from for departure and return, each of which includes carrier, flight number, departure city, connections, destination city, data and time of each connection, aircraft type, cabin class, flight award miles, whether meals are served and travel time total for all connections and command boxes to continue the process or start over.

If the user chooses to continue, she may have to wait for the entire next page to render only to find out that there has been some error and she has to back up and make a new selection which involves rendering another page and giving the flight selection commands again.

Once all errors are cleared, the user will have to wait for a page to render that has an input form (in addition to many other things) upon which the user can enter her AAdvantage number and her password to log in or to enter a command to continue without logging in. After logging in or giving the continue without logging in command, another page will be loaded and rendered which includes a form which the user can enter her name, AAdvantage number or other frequent flyer number, the frequent flyer program she is in, if any, and her passenger type (adult, senior, child, infant in a seat) and her contact information including her cell number, home number, business number and email address and any promotion code she may be using. She has to enter all the information in required fields, or an error will be generated and a whole new page indicating the error will have to be loaded and rendered. This same passenger information page includes a table of her itinerary, a table which gives the fare summary and a modify search table along with a graphic indicating where she is in the reservation process. She still has four more pages to go if everything goes well.

After entering all the requested data, another page loads which includes a table having her selected itinerary, a fare summary, a summary of her passenger information, a graphic showing her where she is in the process and a hold and start over command button along with numerous other graphic images and links.

After giving the hold command, another page loads which includes a hold reservation summary, command buttons to email the itinerary, send to a calendar or print the page, a table including the record locator, status of the reservation and reservation name, another table including her itinerary, a table giving the fare summary, a table giving the summary details, a box containing text, an image and links allowing her to buy trip insurance, a box containing text, images and links allowing her to add reservations for a car, hotel and one day Admiral's Club pass to her itinerary and numerous other links and graphics.

Most of the page structure on each of these pages which the user must wait for her phone's browser (or her computer's browser) to render is of no interest to her and delays the process of getting done what she wants to get done. Because many web sites are not designed well or optimized to be rendered on phones, some or all of the pages may not render at all or may take so long that she loses interest in the process. She may be ready to actually buy a ticket, but the aggravation and delay of waiting for each complete page to render on her phone (or even her desktop computer) may cause her to give up and not buy a ticket. She may even drop her data subscription on her cell phone concluding that it is not worth the $30 per month or thereabouts which she pays for it because internet browsing on a phone is too slow and frustrating. This is bad for American Airlines and bad for the consumer and bad for the cell phone carrier who lost the data plan subscription.

To make websites useful on cell phones, web sites that have already been developed, often at considerable expense have to be re-created for use with cell phones. A re-creation of each web page on a site would be necessary to support use of the site on cell phones, and this imposes additional expense and delays. Any additional or different content for cell phone usage of a page adds further expense. Aggravating these problems is the fact that this re-creation process has to happen separately for each different kind of cell phone operating system thereby multiplying the delay and expense.

A need has arisen for an application program and supporting systems and tools that can speed up the process of browsing the internet, especially on a cell phone, so as to allow users of mobile phones and even desktop computers and laptops to get things done on the internet more expeditiously and without as much frustration.

DETAILED DESCRIPTION OF THE VARIOUS EMBODIMENTS

The systems described herein in all embodiments comprise any method and apparatus to limit the amount of data transferred to a cell phone or other computer from a web site by using a task workflow template to guide a microbrowser in searching the tags in an HTML page for specific tags and extracting only that information. This greatly speeds up accomplishment of tasks on the internet, especially on cell phones.

The systems described herein in all embodiments also contemplate packaging into single task workflow templates specifications of one or more web pages to process and specification of the specific tags from each web page to search for and extract the information labeled by said tags. This enables accomplishment of most if not all tasks that can be accomplished from web pages on the internet or HTML documents generated by application programs, and enables rapid accomplishment of very complex tasks.

The systems described herein in some embodiments also contemplate storage of task workflow templates on one or more template servers on the internet and protocols to download task workflow templates into cell phones and computers. Some embodiments of the microbrowser described herein automatically check version numbers of task workflow templates stored locally in a cell phone or computer against version numbers of task workflow templates stored in the template server to ensure the latest task workflow templates are being used. This way when web sites change and the task workflow templates needed to process the web pages of the web site to accomplish a task get updated, the updated versions automatically get downloaded onto cell phones and computer using said tasks. However, the task workflow templates can be loaded into the cell phones or computers by any method including insertion of flash drives, data cards or CD-ROMs.

Figure 1:
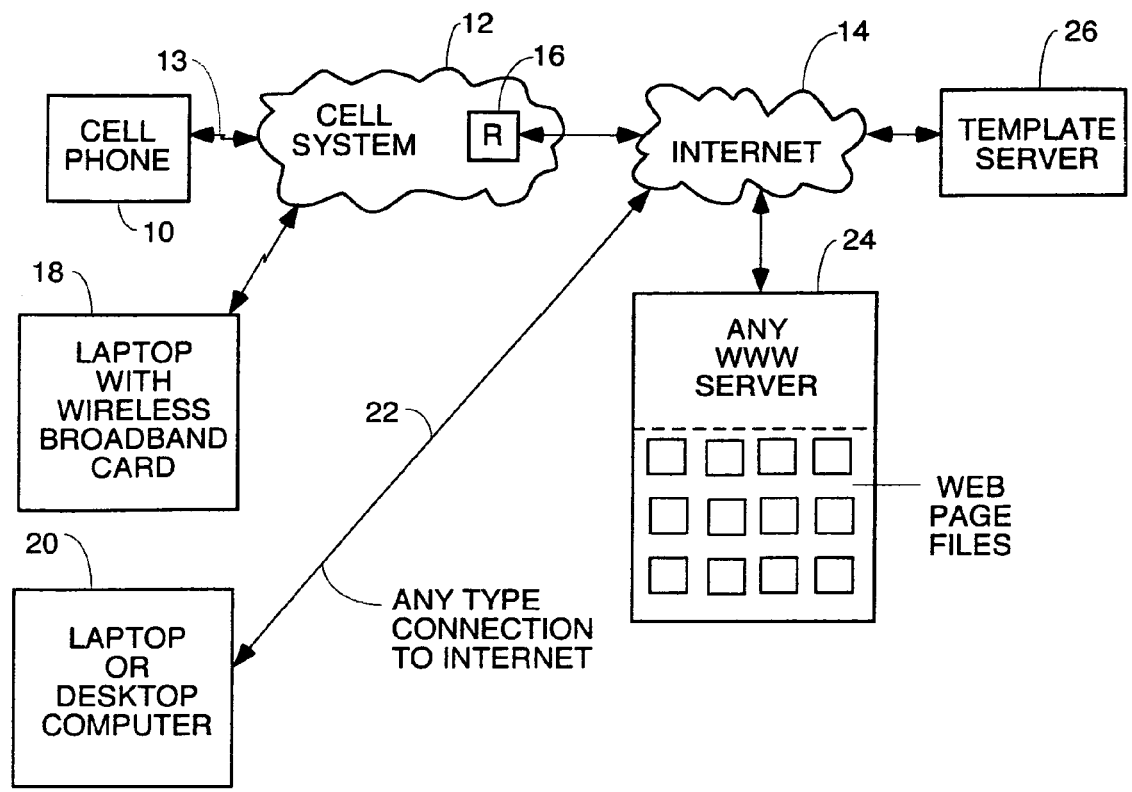
FIG. 1 is a block diagram of the environment in which the teachings of the invention find utility.

FIG. 1 is a diagram of the environment in which the teachings of the invention find utility. The teachings of the invention make accomplishing tasks via the internet on any computer faster, but it makes accomplishing tasks on the internet using smart phones or other cell phones with browsing capability much faster. Cell phones are very limited in their computing power, memory and screen size. This makes use of the internet through a cell phone to actually accomplish some task very frustrating or impossible, because web pages are full of graphics, images, Java scripts, flash animations and other things that take the phone a long time to figure out how to render and actually render on the small screen size of the phone.

The Basic Process

The basic process of the preferred embodiment where the client computer executes the microbrowser and is a cell phone or laptop or desktop computer coupled to the internet in any way is as follows.

1) Select and activate a task and load the selected task's task workflow template into memory to allow said task's task workflow template to control processing by the microbrowser. The task workflow template may be stored locally on the client computer or it may be downloaded from a template server which is coupled to the client computer via the internet.

2) Request the first web page designated in the task workflow template and load only the HTML or XHTML file of the page.

Use the task workflow template to search through the tags in the structural layer defined in the HTML or XHTML document (any other document format could also be used also in other embodiments, but one that defines the structure of a web page and provides semantic meaning to the structure is preferred) to find only the elements from the page to be displayed (the task workflow template blocks rendering of things on the page which are not required to get the task done and which are not part of the template). Frequently, the information the user wants is only text which is included within the HTML or XHTML document which was fetched for a web page so the information of interest can be directly extracted from the fetched HTML or XHTML document itself without need for another request being sent to the server to download an image, video or other file for which only the path is in the document originally fetched. Almost all of the text seen on a web page is actually in the HTML or XHTML document fetched by the task workflow template. If some document format other than an HTML or XHTML document is retrieved by the task workflow template, and tags are not used, the task workflow template includes instructions that control the microbrowser to search the document in any way to locate the desired content such as by string matching, location on the page, artificial intelligence, etc. and render only the elements selected by the task workflow template.

This fundamental process is at the heart of most embodiments that use web pages as the source of information. Most tasks involve accessing multiple web pages however. For example, just to get a stock quote from a web server requires accessing a first web page and using that to fill in a form on the page which gives the ticker symbol of the stock of interest. That information is then used by the web server to retrieve another web page and send it to the requester, the second page containing the actual information on the current price of the stock. The task workflow template for such a stock quote task would be used to request the first page and prevent rendering of everything on the first page but the form on the web page in which the stock's ticker symbol is entered. The task workflow template would then send the filled out form with the ticker symbol of interest back to the web server which would then respond by sending back the second web page. The task workflow template would then search the second web page to find the tags that surround the current price of the stock and block rendering everything on the second web page except the part of the page that reports the current price of the stock of interest.

Changes in web pages from the structure they had when a task workflow template was created can cause a task workflow template to fail or require it to use pattern matching to find and extract the information it needs and not use tags since the tags might change. Eventually, web site authors may cooperate by using "reliable tags" which do not change when the web page is changed. This means no matter how much or often a web page changes its content, the task workflow templates will always be able to find and extract the information enclosed within the reliable tags since those will not change and it is the reliable tags which are included within the task workflow template modules which are designed to guide the microbrowser to find and extract information from the HTML or XHTML document of the web page (any other document format may be used in other embodiments, but one which defines the structure of the web page and provides semantic meaning is preferred).

ADVANTAGES

The main advantage of processes within the genus of the taskflow filtering aspects of the invention is its blazing speed even when using a cell phone to accomplish tasks on the internet. The task workflow templates limit rendering of content of a web page to only the heart of what the user is interested in on the page. That may be text only, a form, an image, a video or any other type of information. Only the information in which the user is interested is extracted and displayed by the task workflow template guidance of the microbrowser. All parts of the page which are not of interest to the user are filtered out by virtue of not being located on the HTML or XHTML document (or whatever other document format is being used) and extracted by the task workflow template. It is this limiting of the content which is located, extracted and rendered which vastly speeds up performance. This speed arises from elimination of non-essential parts of web pages that are slow to render (like graphics) and which are not needed to accomplish the task. These non essential parts of web pages slow down rendering of the page even on desktop computers, and, with the limited resources of cell phones in terms of screen size, processor speed and memory limitations, rendering of these non-essential parts of the web page can lead to a very slow and frustrating experience and often leads to wasted time in that the task one is trying to accomplish on the web with the cell phone does not get accomplished at all. The microbrowser is called a microbrowser because the task workflow templates which control it strip out the slow-to-render parts of a web page which are not essential to accomplishing a specific task per any particular task workflow template.

The application that uses task workflow templates to filter out non-essential parts of web pages will be referred to herein as a "microbrowser" because it strips off non-essential parts of web pages that are not essential to getting a task done.

Technically speaking, the microbrowser is not just a browser. Although it has the ability to request web pages, the microbrowser also has the ability to perform tasks with other application programs through their application programmatic interfaces. For example, if part of a task is to look in the address book of Outlook for a phone number or a URL of a business, the microbrowser has the capability to make a function call to Outlook to have Outlook look up the required phone number or URL, pass the required argument to Outlook (the name of the business). When Outlook returns the required information, the microbrowser uses it as part of accomplishing the task encoded in the task workflow template.

A significant advantage of the use of a microbrowser with task workflow templates to guide the processing thereof is that the system is highly customizable. A user can create any type of task workflow template to do any task requiring as many web pages or other applications as is required. Task workflow templates can be created which both extract information out of web pages and do functions and extract information from any other application which has an API for which the task workflow template can invoke function calls to accomplish things using that application program. A task workflow template can be created by any user with no programming skills using a tool which will be made available by the inventors. One of the advantages of task workflow templates is that they allow ordinary users to create virtual application programmatic interfaces for web pages, and as many APIs as are needed for as many web pages as are needed to accomplish a task can be created. The API created essentially is a set of virtual function calls which allow certain information from a web page needed to accomplish a task to be located and that information to be extracted and displayed on a computer. The virtual API of a task workflow template is customizable, extensible and modifiable. And its content is not dependent upon the thought processes, limitations or agenda of a programmer that creates an API for a net app. A net app is an application program that runs on some server on the internet and presents an API to client computers who can remotely make function calls to cause the net app to do something or send some information to the client computer. The API created for the net app is up to the programmer of the net app and users of the net app cannot create it, change it, customize it or extend it.

The microbrowser and task workflow templates allow speeding up the use of all existing websites regardless of whether the client computer is a desktop, laptop or cell phone, and is especially useful for cell phone access. The type of operating system of the cell phone or other client computer is not important and no re-creation of any web page for use by cell phones or other mobile users is necessary.

The microbrowser works directly with the web servers that serve the web pages needed for the task. There is no middleman server or service required. The microbrowser just uses the task workflow template to process the tags in the HTML document that defines the structure of the web page to strip out just the tags for the parts of the page that are needed to accomplish the task. Usually, that is just text from the page and the text of a web page is all included in the HTML document so the microbrowser already usually has everything it needs to accomplish the task when the HTML document arrives. The many of the rest of the tags of an HTML document defining the structure of a web page enclose pointers or paths to graphics, audio files, video files, flash presentations, etc. A regular browser in a computer or cell phone would then go back to the various servers where these files pointed to by the paths are stored and request download thereof. Only after downloading all these other files (which usually have large file size since they are images, video, audio etc.) does the browser on the phone or computer complete the correct, fully legible rendering of the page. This is what takes so long on a phone because, in addition to the slowness of the phone's circuitry itself, the files are big and the data throughput of a data link on a cellular system is much slower than Uverse optical fiber, cable or DSL. By eliminating the need to download all these files that are big and not necessary to accomplish the task, the process is greatly speeded up and the cell phone is turned into a tool which is actually useful to accomplish something on the internet.

The microbrowser may need to retrieve the task workflow template from the template server 26 in FIG. 1 to make sure it has the most recent version of a task workflow template, but after the task workflow template is loaded into the cell phone 10, laptop 18 or desktop 20, the process can be carried out with no further interaction with the template server 26. It is the task workflow template that allows the microbrowser to turn many web pages serviced across many web sites into a single workflow to accomplish a task on the internet with high speed, even if the task is attempted with a cell phone of limited capability. Because the microbrowser works directly with the web servers supplying the needed pages and no proxy server is needed, there is no forwarding of information and no added risk to the data transfer. This also cuts down on traffic on the internet.

Traffic is also cut down on the internet by use of the teachings of the invention in another way. Fundamentally, the basic way in which the microbrowser does its function causes less data to be sent over the internet each time a web page is accessed, and that cuts down on traffic on the internet substantially. More specifically, to accomplish a task defined in a task workflow template, the microbrowser sends to a server on the internet a URL of a web page it needs to accomplish part or all of a task. This causes the web server to which the URL is directed to send to the microbrowser only the HTML document (a portion of the web page) that defines the structure of the web page. A web page is also comprised of any other files such as audio, video, graphic and text files that form various parts of the web page when the web page is completely rendered. The structure of the web page is defined by tags of various sorts in the HTML document. An HTML document is comprised of text or unicode which has been marked up with tags that indicate elements of the page or other necessary declarations. An element is a structural component such as a text paragraph, image or a desired behavior. The HTML page has semantic descriptors of other content of the page called tags. Each different type of element such as image, cascading style sheet, flash presentation or script, has its own special tag. If the element is not text, then the tag encloses a pointer or path to the server where the image file, etc. can be found and the location of the tag on the page indicates where that image or flash presentation etc. is to be rendered on the page.

The HTML document is the structural layer of the web page and is the foundation upon which the presentation layer and behavioral layer of the web page is built. The presentation layer is comprised of cascading style sheets which are instructions for how the elements of the page should be delivered or displayed. Style sheets are rules for how each element should look, and are attached to the web page document either in a separate document or in the header of the web page HTML document. The behavioral layer is comprised of scripting and interactivity. Interactivity of a page is provided by javascripts and forms, each of which have their own special tags. Forms allow a page to collect information from a user via controls such as buttons, text fields and scrolling menus. Javascripts are indicated by their special tags and the script itself can be enclosed within the tag or the tag can point to an external page which includes the javascript.

In the HTML document, each element of the structural layer of a web page is semantically name by a tag enclosing the text of the element, the javascript or style sheet information or information pointing to the javascript, style sheet or file containing other information to be displayed on the page. The tags enclose text to be included on the page, or the path to other files such as graphics files, audio files, video files, etc.

The microbrowser, using the task workflow template (which may also sometimes be referred to as a configuration file), knows exactly which tags it is looking for in the HTML document (they are specified in the task workflow template) and it searches the HTML document for those tags, and when it finds them, it extracts just those tags. The tags in the HTML document are basically instructions on how the render the web page when a browser renders the whole web page. The tags which are extracted by the microbrowser are then sent to the server on the internet which sent the HTML document in the first place, and that server responds by sending just those portions of the web page specified in the tags back to the microbrowser for rendering. Since most of the web page's files are stripped out during this process, much less data is sent by the server to the microbrowser which results in less traffic on the internet and less energy being used by the server.

Another significant advantage of the technology of the invention is that is makes the investment in brute force fourth generation (4G) cell towers, 4G cell phones and 4G protocols unnecessary. The hundreds of millions of dollars of capital investment that will be needed to upgrade the many cellular systems and phones to 4G speeds to get a reasonably fast mobile browsing experience on a cell phone are unnecessary if the teachings of the invention are used. The microbrowser may be loaded on existing cell phones without the need to change the hardware and software of the phone and without the need to change the hardware or software of the cellular system towers.

The microbrowser is also highly secure because no URLs are rendered except those required by or designed into a task workflow template.

Each task workflow template serves as a story board or workflow because multiple pages and web sites can be integrated into a single workflow specified by a task workflow template. A task workflow template consists of a rolling sequence of condensed or "stripped" web pages from any number of web sites or application programs. On the left side is the information from the stripped web page which is usually just text, and on the right hand side of the display is metadata such as web address of a typical page, any user tags added to help understand what is going on in that particular step and the date and time or currency stamps to tell if a site has been changed since the task workflow template was created to assist in watching for errors. Speed is improved also because things that can be started in parallel, are started in parallel (such as multiple browser windows being opened and each seeking out a different URL). Further, user configuration data such as names, addresses, phone numbers, email addresses, user names and passwords needed to enter in a web site or log onto web sites, services or application programs can also be stored in the task workflow template to be called into a page to fill out a form as necessary so as to speed up the process of getting a task done. The microbrowser can maintain a taxonomy of thousands of workflows. These workflows can be organized by web site, topic, function, such as car rental, business travel, home buying, Yahoo!™ Financial, Citibank account management, cell phone bill management, credit card account management, Ebay, Amazon, etc. and can be used cell phone or computer that uses the browser to get specific tasks done on the internet in an expeditious fashion. The microbrowser creates an output file to save outputs from a browser task such as itineraries, stock prices, confirmation numbers, email instructions, etc.

The microbrowser can be used to generate extra revenues from advertisers and companies that sell goods and services over the internet also by making them pay to have their ads or graphics included in task workflow templates. In addition, task workflow templates tell advertisers exactly what the users are browsing and what they are interested in, so the advertisers will be willing to pay premiums to include in the task workflows advertising targeted specifically to what the user is known to be interested in by virtue of the fact that the user is using that particular task workflow. Another source of revenue made possible by systems employing the teachings of the invention is that companies can pay to have a license to generate and place on the template server 26 task workflow templates that access the web sites from which those companies sell products or services.

The Hardware Environment

FIG. 1 is a block diagram illustrating the environment in which the teachings of the invention finds utility. A cell phone 10 having web browsing capability is coupled wirelessly to a conventional cellular system 12 via three different data paths all represented by wireless data path 13. Wireless data path 13 comprised digitized, compressed voice data that is modulated onto a narrow band radio frequency carrier in a first voice band. Another data path represented by wireless data path 13 is the Short Message Service or SMS which is digital data containing text messages modulated onto another RF carrier at a different frequency than the voice band RF carrier previously mentioned. A third RF carrier having a wide bandwidth in yet a different band of frequencies carries digital data comprised of packets received from and sent to the internet via the data path of the cellular system 12 which is coupled to the internet 14 through a router 16. The digital data in this data channel is encapsulated in packets. These packets are usually comprised of TCP/IP packets encapsulated into whatever protocol packets the cell system uses and modulated onto the third RF carrier using whatever TDMA, CDMA or other multiple access scheme the cellular system 12 is using. The digital data transferred to and from the internet by the invention travels on this path.

The modulation and demodulation circuitry, RF transceivers and multiple access protocol processing circuits of the cellular system (not separately shown) are conventional and no modifications need be made to practice the invention. The modulation and demodulation circuitry, RF transceivers and multiple access protocol processing circuits of the cell phone are also conventional. These circuits need not be detailed since no modifications are necessary to practice the invention other than to load the microbrowser 169 in FIG. 3 into the software architecture of the cell phone and to load the task workflow templates 171 into one of the data storage circuits of the cell phone. The task workflow templates 171 are typically loaded into DRAM of the cell phone and guide the processing by the microbrowser 169. In FIG. 3, the data path 173 between the microbrowser and the task flow templates is symbolic. The actual mechanism by which the microbrowser accesses the task workflow templates is the way any application program accesses memory and is known to those skilled in the art and is typically made, as symbolized in FIG. 5, by making a function call 175 to the API of the kernel 160 asking for access to the DRAM. The kernel then makes a call 177 to the API of the storage I/O software 179 which then accesses the requested data from the task workflow templates from storage 181 by any data path 183. Data path 183 is typically implemented by generating the desired address on the address bus portion of bus 102 in FIG. 2 and generating the appropriate read access control signals on the control bus within bus 102 of the computer coupled to the storage device and reading the requested data on the data bus portion of bus 102. The data read in this manner is returned to the kernel by a function call to its API. The kernel then makes a function call to the API of the microbrowser and returns the requested data to it. The storage 181 can be DRAM 106 or flash memory 110 or other storage such as ROM 108 or CD-ROM 111 in FIG. 2.

Likewise, laptop 18 with a web browsing capability (TCP/IP protocol stack etc.) and a broadband wireless capability is also coupled via the cellular system data path 12 and router 16 to the internet 14. A laptop or desktop computer 20 with a browsing capability has a hardwired connection 22 to the internet 14 via a cable modem, DSL modem, satellite link, POTS modem, T1 line modem, etc. (not shown) and the routers of the internet service provider (also not separately shown) which provides the user with internet access.

The users of these computers and cell phones wish to accomplish some task such as making an airline reservation, checking movie showtimes, etc., and to do so they must access web pages provided by one or more servers 24 on the internet. Tasks that the users wish to accomplish are encoded in task workflow templates stored in a template server 26, and these task workflow templates are downloaded into and stored in the cell phone 10 and laptop 18 and computer 20. These task workflow templates provide filtering and workflow instructions to the browser, and make the process of accomplishing the desired tasks much faster, especially on the cell phone 10. Each task workflow template can display or retrieve information from many web pages and web sites. The task workflow templates can include log in pages where the user's credentials are automatically filled in at appropriate places in the log in form, and can include search results and other key items on a web page. The latest versions of each task workflow template are stored on secure server 26.

Figure 2:
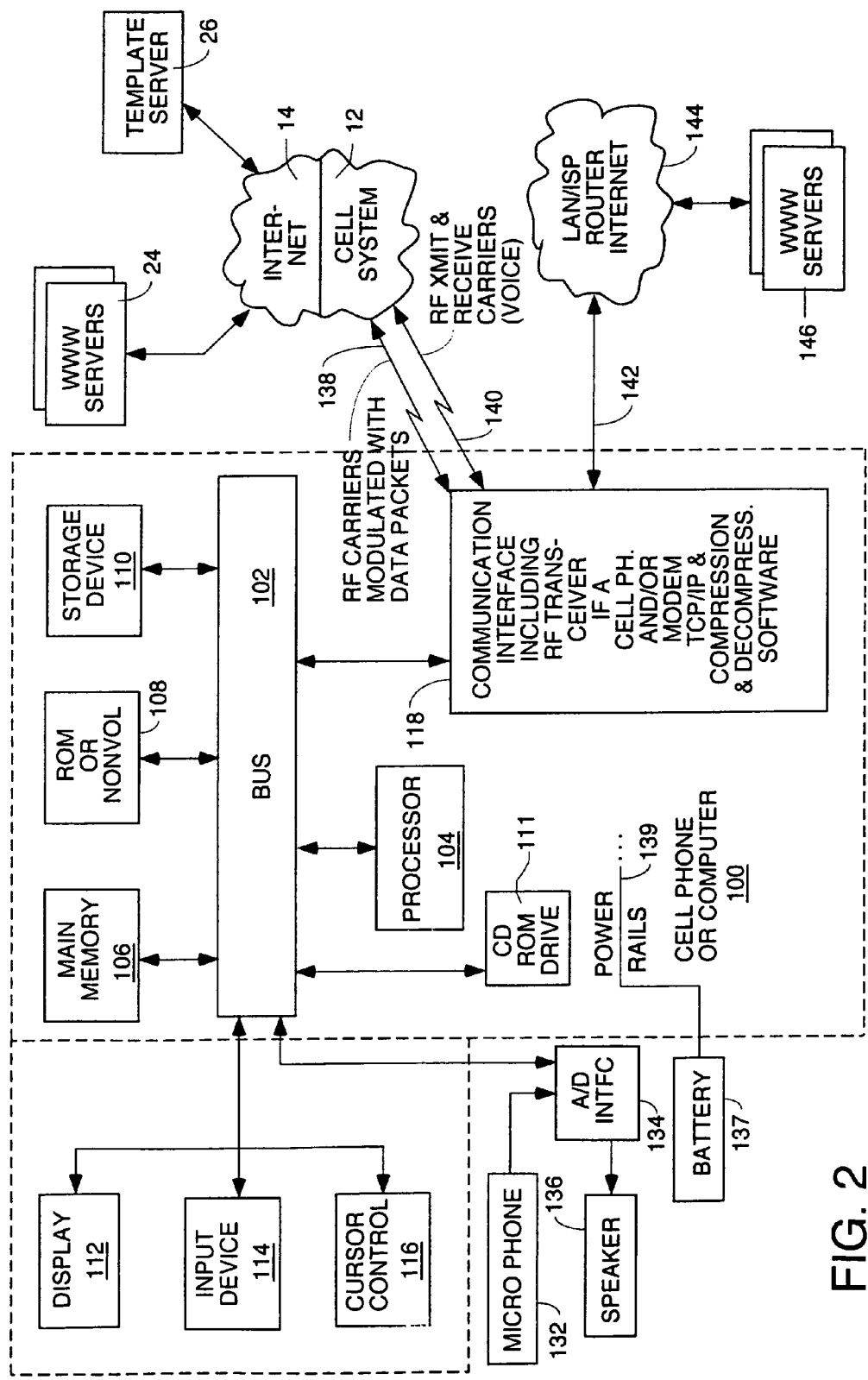
FIG. 2 is a block diagram of an embodiment of a computer or cell phone in which the teachings of the invention may be practiced.
Figure 3:
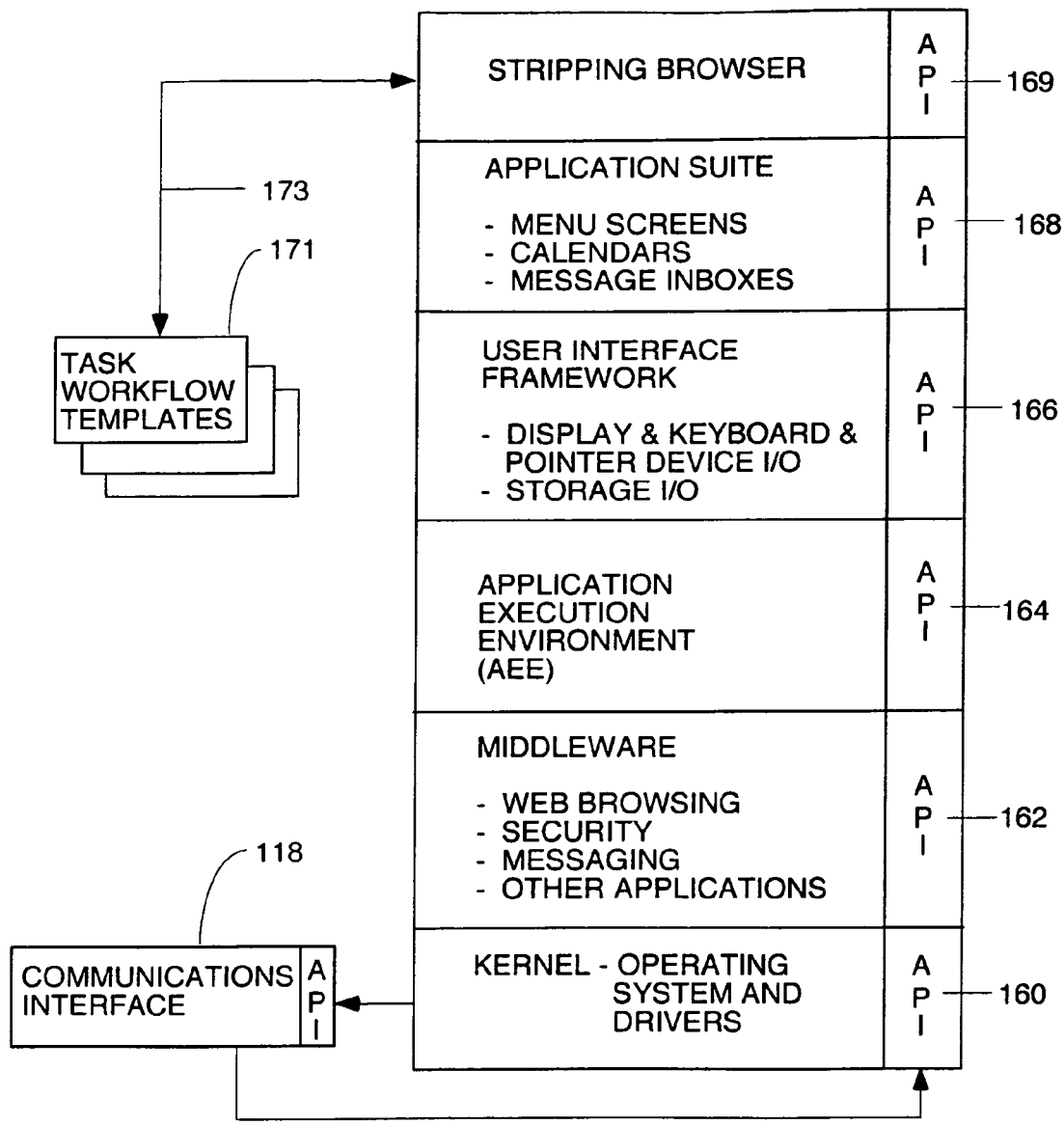
FIG. 3 is a software architecture showing the various layers of software in a typical smartphone type of computer in which the teachings of the invention may be usefully employed.

FIG. 2 is a block diagram that illustrates a typical computer system or cell phone 100 upon which an embodiment of the invention may be implemented. Computer system 100 includes a bus 102 or other communication mechanism for communicating information among the various circuits in the computer or phone. Processing of operating system instructions and application program instructions is done by a processor 104 which is typically a microprocessor or sophisticated Digital Signal Processor or DSP whose instruction set and internal structure are optimized for processing digital data. The processor 104, in cooperation with the operating system application programmatic interface, handles, among many other things all the housekeeping chores in communicating with the input device 114, the display 112, the cursor control device 116 and the communication interface 118.

Operating system instructions and application program instructions executed by processor 104 can be stored in main memory 106 (which is typically volatile random access memory) or read only memory 108 (which is typically non volatile memory such as EPROM or EEPROM) or storage device 110 (which can be a non volatile rotating bulk memory typically referred to as a hard disk) or CD-ROM drive 111. Typically, the operating system instructions and instructions for some type of Personal Digital Assistant or web browser as well as customizable features such as the phone's directory, etc. are stored in ROM 108. Typically, instructions executed by processor 104 are loaded into Dynamic Random Access Memory (DRAM) of main memory 106 at boot time from ROM 108 or storage device 110 or both, and executed out of DRAM 106 for speed. However, the processor 104 can also execute instructions from ROM 108 and/or any one of the memories or storage devices discussed herein.

The term "computer-readable medium" as used herein refers to any medium that participates in providing instructions to processor 104 for execution. Such a medium may take many forms including both volatile and non-volatile memory. Non-volatile media include, for example, optical or magnetic disks, such as storage device 110. Volatile media include dynamic random access memory, such as main memory 106. Transmission media used for lines 142, 138 and 140 include radio frequency carriers, coaxial cables, copper wire and fiber optics. Transmission media can also take the form of light waves, such as infrared (IR) data communications or light wave transmissions on optical fiber. Common forms of computer-readable media include, for example, a floppy disk, a flexible disk, hard disk, magnetic tape, any other magnetic medium, a CD-ROM, DVD, any other optical medium, a RAM, a PROM, EPROM, a FLASH-EPROM, or any other memory chip or cartridge or any other medium from which a computer can read.

Various forms of computer readable media may be involved in storing and/or transmitting one or more instructions to main memory 106 or processor 104 for execution. For example, the instructions may initially be borne on a magnetic disk of a remote computer such as server 146 out on the internet. The remote computer can load the instructions into its dynamic memory and send the instructions over any transmission medium to communication interface 118. Communication interface 118 receives the instructions and/or data and places the data on bus 102. Bus 102 carries the data to main memory 106, from which processor 104 retrieves and executes the instructions. The instructions stored by main memory 106 may optionally be stored on storage device 110 either before or after execution by processor 104.

One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

For computer systems 100 that are cell phones or laptops with cellular broadband cards installed, SID and MIN codes are typically stored in internal ROM or flash memory 108. Memory 108 can be in the form of a removable flash memory or SIM card.

The computer systems 100 that are cell phones or laptops with cellular broadband cards installed also have a battery backed up clock chip (not shown) which usually uses a watch battery for battery back up.

The instructions executed by processor 104 may be loaded in the computer either by inserting a CD-ROM or flash memory drive with the instructions stored thereon into the computer or they may be downloaded into computer 100 from a server on the internet such as server 24 or template server 26. Typically, the computer or cell phone 100 comes programmed at the factory with its operating system programs and a few basic application programs like programs to operate the telephone, send and receive text messages, browse the internet, send and receive email.

The processor 104 is coupled with bus 102 for processing information. Typically this bus is a data bus, address bus and control bus which carries addressing signals and control signals to the various other circuits in the computer and carries data from the processor to those other circuits and carries data from those other circuits to the processor 104.

Computer system 100 typically includes a main memory 106, such as a random access memory (RAM) or other dynamic storage device, coupled to processor 104 by bus 102 for storing information and instructions to be executed by processor 104 but this is not true in all embodiments. Main memory 106 also may be used for storing temporary variables or other intermediate information during execution of instructions by processor 104. Processor 104 is coupled to a read only memory (ROM) 108 or other static storage device coupled by bus 102 for read and/or storing information and instructions for processor 104. A storage device 110, such as a magnetic disk or optical disk, is coupled to processor 104 via bus 102, said storage device also for storing information and instructions and supplying data and instructions to processor 104.

Processor 104 is coupled via bus 102 to a display 112 to display information to a user. Typically, in a cell phone, the display is quite small and is a liquid crystal display or LCD or plasma type of display. In laptops or desktop computers, the display may be LCD, plasma or an older technology such as a cathode ray tube (CRT). An input device 114, including alphanumeric and other keys, is coupled to processor 104 via bus 102 for communicating information and command selections to processor 104. On cell phones, the input device may be a touch screen display of a keyboard such as in the iPhone™ type smartphone or the input device may be actual keys like in some smartphones such as the Blackberry™ smartphone. Another type of user input device to which processor 104 is connected via bus 102 is cursor control device 116. On desktop machines and laptops, the cursor control device can be a mouse, touchpad, trackball, or cursor direction keys for moving the insertion point around the screen. On smartphones such as the iPhone, the cursor control device is a touchscreen and suitable driver software. On smartphones such as the Blackberry, the cursor control device is a small trackball on the keyboard. The cursor control device is for giving commands and controlling cursor movement on display 112 so that text messages can be typed, forms on web pages filled in, etc. This input device typically has two degrees of freedom in two axes, a first axis (e.g., x) and a second axis (e.g., y), that allows the device to specify positions in a plane. A tap on the screen, push of a mouse button or push of the trackball in selects the current location of a cursor as the insertion point.

A microphone 132 is coupled to the processor 104 through bus 102 and an analog-to-digital conversion circuit 134. Sounds picked up by the microphone are digitized by A/D circuit 134 and sent to the processor 104 for inclusion in packets sent as part of cell phone conversations. Typical cell phone systems use full duplex channels and use a transmit carrier at a first frequency transmitted by an RF transmitter in a communication interface circuit 118 to transmit one side of the conversation as Time Division Multiple Access (TDMA), Frequency Division Multiple Access (FDMA) or Code Division Multiple Access (CDMA) packets modulated onto the transmit carrier to cell towers in cell system 12. FDMA puts each call on a separate frequency, TDMA assigns each call a specific time slot, and CDMA assigns each call to a spreading code and spreads the spectrum of the call over a band of frequencies. TDMA, in the IS-136 standard, uses a narrow band of frequencies that is 30 kHz wide in the 900 mHz range, with bursts that are 6.7 milliseconds long and which are divided into three time slots. Each conversation gets one time slot. GSM is TDMA which is encrypted and incompatible with IS-136 and operates in 900 mHz and 1800 mHz bands in Europe and Asia.

Received data packets, after reception, depacketization, decompression and error correction processing are sent by processor 104 to the A/D converter 134 and are converted to analog sound signals which are played to the cell phone user by speaker 136. The voice carriers are represented at 140.

The computer 100 also includes a battery 137 if it is a laptop or cell phone, and that battery is coupled to power rails 139 to supply power to all the circuits in the computer when operating on battery power.

Data packets for web browsing, email and internet access are sent and received on one or more entirely different radio frequency carrier channels 138 transmitted to and received from data transmission RF transceiver equipment in the cell towers of cell system 12. Typically, cell systems use frequency shift keying modulation of the RF carriers to modulate onto the RF carriers the digital data of TCP/IP packets containing compressed digital data payloads. The communication interface 118 includes RF transceiver circuitry, an antenna and modulation circuitry to implement whatever compression and digital data transmission protocols are in use in the cellular system. The communication interface also includes RF amplifiers to handle signals going to and coming from the antenna.

Networking protocols that cell phones typically use range from 2G, 2.5G, 3G and 4G, each being more advanced from its predecessor. The invention is not dependent upon any particular protocol and any protocol that can send and receive data packets through the cell towers via the data path (as opposed to the SMS or voice data path) to and from the internet will suffice. Until recently, most smartphones used GPRS protocol which stands for General Packet Radio Service, a wireless, packet-based communication service referred to as 2.5G. This is a packet switched "always on" connection which remains active as long as the phone is within range of a tower with the service. It allows smartphones to run applications remotely over the internet, interact with servers on the internet, participate in instant messenger sessions, act as a wireless modem for a computer or transmit and receive emails. GPRS can send and receive data at a rate of 114 kilobytes per second (Kbps), way too slow for effective web browsing. Newer smartphones use the EDGE protocol which stands for Enhanced Data GSM Environment. EDGE networks can transmit data at three times the speed of GPRS networks (384 Kbps). Many smartphones are still using the EDGE protocol although it is still generation 2.5. Generation Three (3G) is the latest network protocol technology available. 3G protocols transmit data in megabytes per second, some as fast as 10 Mbps. Some of the 3G protocols available are: Evolution Data Maximized (EVDO from Sprint); High-Speed Downlink Packet Access (HSPDA); Wideband Code-Division Multiple Access (WCDMA) and Universal Mobile Telecommunication Service (UMTS). Fourth Generation protocols with data transfer speeds of around 5 Gigabytes per second are coming. One at least has been experimentally tested and is 500 time faster than 3G protocols. Use of the invention could prevent the need for cell carriers to invest the massive amounts of money necessary to implement 4G networks in their towers and obsolete everybody's smartphone so they need to upgrade to a 4G phone.

Smartphones have processors which run at clock speeds of only 100 to 624 Mhz, which is mind numbingly slow if such a processor were to be used to run a typical desktop computer. Power consumption is a big issue for phones so to extend battery life, smartphones often use power-efficient ARM processors. The smartphone processor chip also typically has on-board RAM memory in the tens of megabytes and smartphones often have slots to receive removable memory cards like SD and MMC cards to extend their memory capability. Limited display size, limited processor speed and limited memory all conspire to make working with web pages on a smartphone not using the teachings of the invention a frustrating and slow experience. Some smartphones have digital camera chips, MP3 player chips, video camera chips incorporated therein and most smartphones have some sort of web browsing software application.

The Software Architecture

A diagram of the software architecture of a typical cell phone but modified to include the microbrowser is shown in FIG. 3. The typical software of a smartphone can be visualized as a stack. At the lowest level is the kernel 160 which is the operating system which implements management systems for processes and drivers for hardware. At the next level up is the middleware applications 162 which is a collection of software libraries that provide the functionality of the smartphone such as security, web browsing, PDA functions, messaging, calculator, calendar, still and video pictures, etc. The middleware applications use the hardware circuits of the phone by making Application Programmatic Interface (API) function calls to the kernel through its API. For example, a web browser application can request a web page by making an appropriate function call to the kernel commanding it to address the communication interface and cause it to transmit out to the internet a URL passed to the kernel with the API function call. Each application of the middleware itself has an API which allows the kernel to call the middleware application and pass it commands or data received from other circuits in the cell phone or computer 100. The next level up in the stack is the Application Execution Environment (AEE) 164 which allows developers to create their own programs. The next level in the stack is a user interface framework 166 which is software that renders the graphics and layouts seen on the display. Basically, this layer of software comprises drivers and interfaces with the display, keyboard and pointing device and may provide I/O services to all the other memory and storage devices in the computer. Memory and storage device I/O services and drivers may be included in the kernel 160 in some embodiments. Finally, there is the application suite 168. This software provides the basic functionality that the user accesses all the time like menu screens, calendars, message inboxes, phone functions like dialing, contacts, voicemail access, lists of recent calls, etc. A barebones system to practice the invention only needs the kernel and I/O services software for the memory and storage devices, display, keyboard and pointing device and the communication interface services of TCP/IP protocol stack. If the computer upon which the microbrowser is being used is a cell phone, the barebones system also needs as part of its software architecture whatever software implements the protocol in use for the cellular system data path for internet data.

The microbrowser and its API that uses task workflow templates 171 to accomplish tasks on the Internet is shown at 169. The task workflow templates 171 are created by users or content designers who select the required portions of web pages needed by a particular workflow and create a story board like workflow for the template. Each task workflow template is available to millions of users of the microbrowser via the internet and secure template server 26. Task workflow templates are downloaded to cell phones, laptop computer and desktop computers which having the microbrowser 169 present in their software architecture. The task workflow templates are retrieved from secure server 26 in FIG. 1 and stored in memory of the cell phone or computer in which the software stack of FIG. 3 resides. These task workflow templates are used by the microbrowser 169 to cause the cell phone or computer to retrieve web pages directly from the web server on the web the HTML structural layer documents of one or more web pages. Access is direct. No proxy server or other middleman server is involved or required. The task workflow template 171 then controls the microbrowser 169 to search through the tags of each HTML document describing the structure of one of the pages in the workflow to find the information needed by the task and specified in the task workflow template. Only that information defined in the task workflow template is stripped out of the HTML document and rendered on the display of the computer or cell phone executing the instructions of the microbrowser.

Task workflow templates 171 are particularly useful when many pages need to be navigated to perform a specific task and drastically speed up the process. For example, for web pages that require log in, conventional browsers running on a cell phone may take minutes for several pages to be loaded and rendered which only relate to credentials and not to the task the user is trying to accomplish.

The Communications Interface

Missing from this stack of FIG. 3 is the TCP/IP internet protocol stack and the stack of software to implement whatever 2.5G, 3G or 4G network protocol the phone uses to communicate with the internet through the cell towers. That software is in the communication interface 118, and is illustrated in the functional block diagram of one embodiment of the communication interface 118 of FIG. 4.

Figure 4:
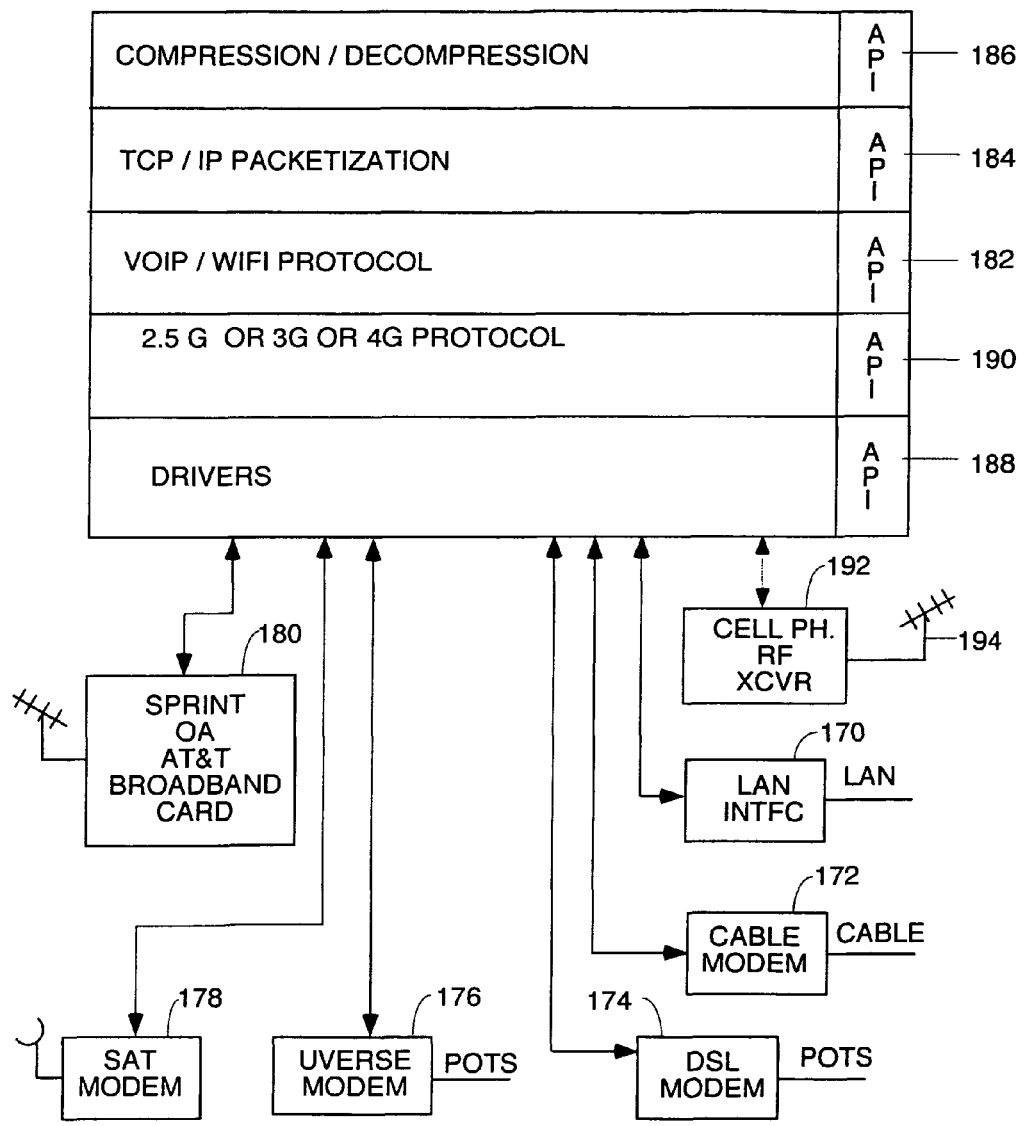
FIG. 4 is a block diagram of the hardware and software architecture of one catch-all embodiment of a communication interface 118 in the computer/smartphone of FIG. 2 for coupling the smartphone/computer to the internet either wirelessly via cellular system technology or through a non cellular type of connection such as cable, DSL, Uverse or satellite.

The communication interface 118 shown in FIG. 4 is only one example of a communication interface which could be implemented. The particular communication interface 118 chosen for illustration in FIG. 4 is a catch-all block that implements most of the practical communication interfaces currently possible. In other embodiments, such as a cell phone computer 100, some of the circuitry shown such as the LAN interface 170, the cable modem 172, the DSL modem 174, the UVERSE modem 176, the satellite modem 178 and the broadband card 180 are not necessary and would not be present. FIG. 4 represents all the circuitry and software needed to communicate voice and data to the cell system towers if computer 100 is a cell phone or a laptop which has WIFI and/or wireless cellular communication circuitry such as the Sprint or AT&T wireless broadband card to provide wireless internet access via the cellular systems to a laptop or other computer with a PCMCIA slot or USB port. FIG. 4 also represents circuitry which could be present if the computer 100 was a desktop computer and had the modems necessary for internet access built in, which most of them do not. WIFI capability is provided by application layer 182. WIFI is a synonym for wireless LAN and is based upon the IEEE 802.11 standard for wireless internet access. WIFI can be used to make free phone calls over the internet, and if such an application is implemented in computer 100, communication interface 118 includes software in layer 182 to implement the Voice Over Internet Protocol (VOIP) to make and receive phone calls for free over the internet.

Communication interface 118 also includes both the TCP/IP protocol software 184 for packetization and depacketization of compressed digital data received from compression and decompression software 186. The compression/decompression software can implement MPEG or other standard compression/decompression protocols that cell phones use to compress and decompress digital data. Compressed data is used both for transmitting and receiving voice conversations and audio and video files as well as for packet traffic with the internet. Modulation and multiple access multiplexing and packetization into whatever 2.5G, 3G or 4G protocol is in use for cell voice conversations and to implement the cellular data channel is implemented by the protocol layer 190. Actual transmission of the packets modulated onto RF carriers is carried out by cell phone RF transceiver 192 which includes the necessary RF amplifiers to receive and amplify RF signals from antenna 194 and send amplified RF signals to antenna 194. Each of the software layers has its own API so that the operating system kernel or one of the other software layers can invoke the functionality of the layer by making a function call and passing the required arguments to the layer.

Communication interface 118 also includes the physical layer circuitry and drivers 188 to interface the processor 104 and bus 102 to the RF transceivers and modem and/or router circuits. If computer 100 is a desktop computer without any RF transceivers, communication interface 118 also includes whatever circuitry is needed (such as a local area network interface or ethernet adapter) needed to couple the computer to a cable modem, DSL modem, Uverse modem or satellite data link modem to provide hard wired internet access for the computer 100. This circuitry sends and receives TCP/IP packets to and from the internet via a hardwire link 142 and cloud 144. Cloud 144 may be a local area network coupled via a router to a cable, DSL line, UVERSE fiber optic cable or satellite link to an Internet Service Provider (ISP) which routes packets on link 142 to and from the internet. All this circuitry and software in communication interface 118 is known in cell phones, laptops and desktop computers already in existence, so no further details will be provided here for the sake of brevity.

How the Microbrowser Works

The teachings of the invention are in part related to the use of computer system 100 with a task workflow template to filter out unwanted things from web pages that slow or stall rendering of the web page on any computer, but on cell phone computers in particular. This process of using task workflow templates to speed up retrieving just the information the user wants from one or more web pages or other application program will be referred to herein as nettasking because it is using the internet and application programs that have application programmatic interfaces in an accelerated way using task workflow templates to accomplish tasks more rapidly, especially on cell phones. Anybody who has ever tried to browse the internet on a cell phone knows how slow, frustrating and annoying such an endeavor can be.

According to one embodiment nettasking is accomplished by computer system 100 by using processor 104 to execute one or more sequences of instructions of the microbrowser application 169 in FIG. 3 that uses a task workflow template 171 to control the microbrowser to carry out a task. The task workflow template instructions (also referred to as a configuration file) for the microbrowser may be read into main memory 106 from another computer-readable medium, such as storage device 110 or CD-ROM 111 or from a flash memory ROM such as non-volatile memory 108. Execution of the sequence of microbrowser instructions from the task workflow template contained in main memory 106 causes processor 104 to perform the process steps described further below by making function calls to an operating system application programmatic interface 160 to cause the operating system kernel to send and receive data to and from the various circuits in the cell phone/computer 100.

Figure 5:
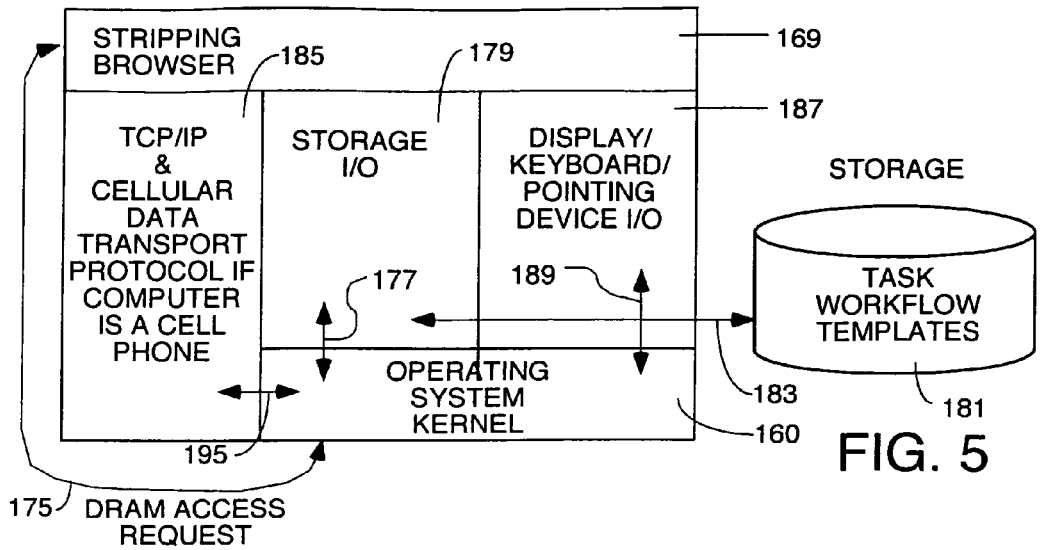
FIG. 5 is a barebones software architecture for a computer using the microbrowser showing only the software that is necessary with no other optional software present.

FIG. 5 is a barebones software architecture for a computer using the microbrowser showing only the software that is preferred with no other optional software present. The microbrowser 169 is an application program that communicates with the operating system kernel 160 in order to access the task workflow templates in storage 181 and communicates with the communication interface software 185 to send request packets out to the internet and receive data back from the internet. The communication interface software is comprised of a TCP/IP protocol stack and cellular data transport protocol stack if the computer is a cell phone or just a TCP/IP stack if the computer is a laptop or desktop computer. Compression and decompression software may also be used on the data path but is usually used only on the voice data path of a cell phone or other computer. The microbrowser communicates with the display, keyboard and pointing device of the cell phone or other computer through function calls to the kernel 160 which communicates with these devices through function calls 189 to the APIs of display, keyboard and pointing device I/O driver software 187. The microbrowser may access the task workflow templates by function calls 175 to the kernel in some embodiments which then makes function calls 177 to the storage I/O software 177. However, in other embodiments, the microbrowser 169 may access the task workflow templates in storage device 181 by making function calls directly to the API of the storage I/O software 179 after the kernel 160 loads the microbrowser 169 into DRAM 106 in FIG. 6 and the CPU 104 starts executing the microbrowser. Processing by the microbrowser is further detailed in FIG. 7.

Figure 6:
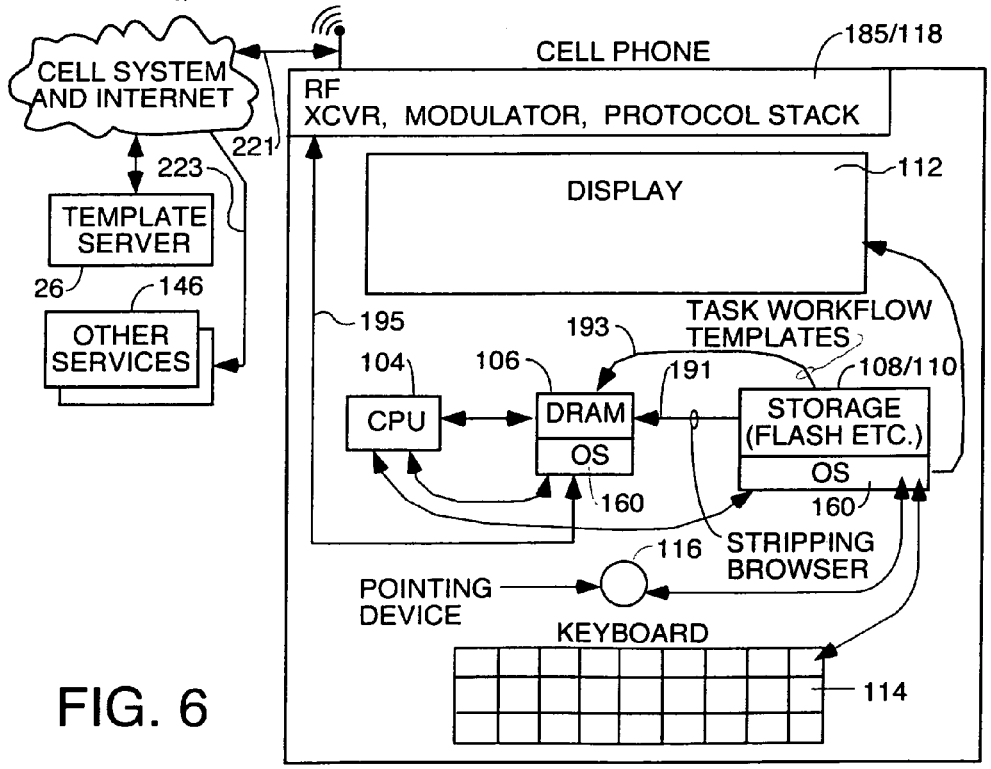
FIG. 6 is a barebones block diagram of a cell phone showing only the circuitry which is necessary with no other optional circuitry present.

FIG. 6 is a barebones block diagram of the hardware circuits of a cell phone capable of browsing the internet using the microbrowser and showing only the circuitry which is preferred with no other optional circuitry present. The CPU 104 executes the operating system kernel 160 either out of DRAM 106 or out of storage 108/110 which may be flash memory or ROM. Typically, the kernel 160 loads 191 the microbrowser 169 into DRAM 106 when the user gives a command via the keyboard 114, touchscreen 112 or pointing device 116 to launch the microbrowser. The CPU then starts to execute the microbrowser.

Figure 7:
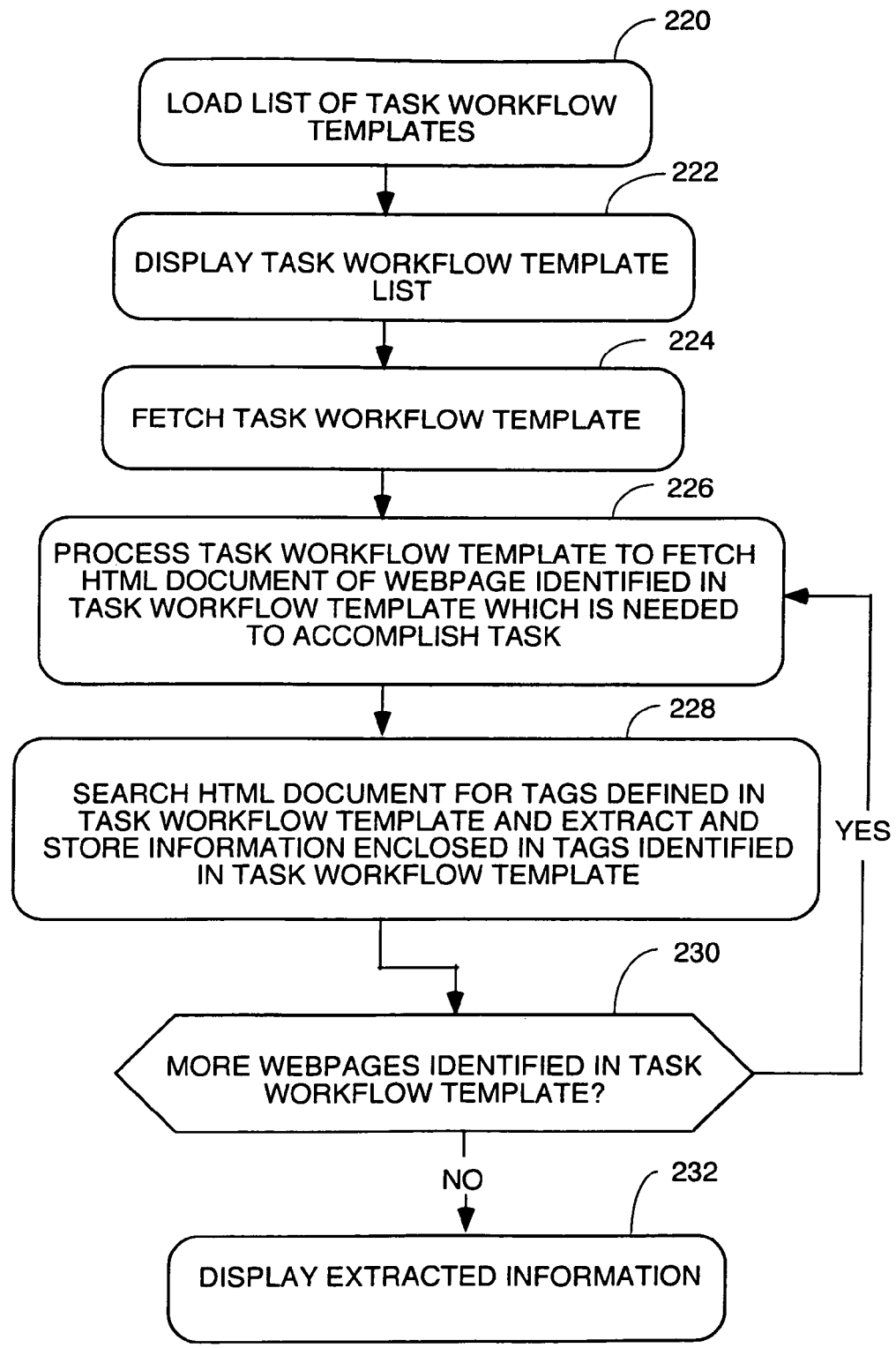
FIG. 7 is a flowchart showing the processing which occurs by the microbrowser to process a task workflow template.

FIG. 7 is a flowchart defining functions performed by the microbrowser to load a task workflow template and use it to retrieve one or more HTML documents and strip out from them only the information needed to accomplish the task. In the following example, the computer executing the microbrowser is assumed to be a cell phone, but those skilled in the art can easily understand how the same process is carried out in either a laptop with wireless internet access through a cell system broadband card or WIFI internet access or by a desktop computer with a hardwired internet connection through a cable, DSL or UVERSE modem or a satellite uplink or T1 line.

Operation of the microbrowser will be described with joint reference to FIGS. 5, 6 and 7. Step 220 represents the process of loading the task list. This process happens automatically when the microbrowser 169 is launched. The microbrowser 169 in FIG. 5 is typically launched by the user doubling clicking on or otherwise selecting an icon representing the microbrowser or doubling clicking or otherwise selecting the microbrowser's program name on a list of programs available on the computer or cell phone and displayed on display 112. This causes the kernel 160 to make an API call to storage I/O software 179 to cause it to retrieve the microbrowser and load it into DRAM as represented by arrow 191. The processes of displaying icons and program lists on the cell phone or computer display 112 and receiving user commands to launch a program are implemented by the kernel 160 by making function calls to the APIs of the display, keyboard and pointing device drivers 187 and sending data to be rendered or requesting input from the keyboard and/or pointing device. When the user makes a selection action, information indicating what has been selected is passed back to the kernel 160 by the driver by a function call to the kernel's API and passing it data as to what has been selected by the user manipulation of the pointing device for launch or what data the user has typed in on the keyboard 114. In FIG. 6, the pointing device 116 (which is usually what is used to give selection commands by the user) is shown as a trackball, but it can also be a touchscreen, mouse, joystick or any other pointing device suitable for the platform. In a Blackberry smartphone, it is a trackball. In an iPhone, it is a touchscreen.

When the microbrowser is launched, the CPU has its program counter (not separately shown) set to the first instruction in the microbrowser and then starts executing the microbrowser's instructions. The initial instructions make an API call to the OS kernel 160 asking that the task workflow list be loaded into DRAM. This is a list of the task workflow templates stored locally in the phone or computer. When the cell phone or computer loads a task workflow from the template server 26, an entry for the task workflow template is made in a task workflow template list kept in the phone indicating which task workflow templates have been loaded into the cell phone or computer. Usually a timestamp and/or version number is loaded also with each task workflow template to indicate its vintage so that the cell phone or computer can check with the template server 26 to determine if the task workflow template it is using is the most up to date version or not. When web sites are changed, task workflow templates not based upon the new web site can fail, so version numbers or timestamps are useful to keep track of whether task workflow templates are the latest versions thereof. A separate administrative task (not shown in FIG. 7) that works in background in the microbrowser constantly checks the timestamp and/or version number of task workflow templates listed on the task list against the timestamp and/or version number of the same task workflow template on template server 26 to make sure the cell phone or computer is using the latest version of the task workflow template. If an outdated task workflow template is discovered, this administrative task automatically downloads the latest version from the template server and replaces the outdated version.

After loading the task list, the microbrowser sends an API call to the kernel asking it to display the task list. The kernel then makes an API call to the display driver 187 and passes it the data of the task workflow template list for display on display 112, as symbolized by step 222.

The kernel, either by polling the touchscreen, pointing device or keyboard, or by interrupt, receives a command from the user via one of the input devices to execute a particular task. The microbrowser then makes an access request for the task workflow template associated with that task by making an API function call to the kernel which makes an API function call to the storage I/O software 179 and passes it the details about which task workflow template to fetch. The storage I/O software then causes that task workflow template to be loaded into DRAM 106, as symbolized by arrow 193 and step 224.

The microbrowser 169 then reads the instructions in the task workflow template and makes an API call to the kernel 160 to request the HTML document of the first web page to be accessed as specified in the task workflow template. This is step 226. The HTML document of the first web page to be accessed is retrieved by the kernel 160 by making a function call 195 to the communications interface protocol stack 185/118 in FIG. 6. Block 185/118 in FIG. 6 includes the TCP/IP protocol stack and the cellular data patch 2G, 2.5G or 3G transport protocol stack as well as the modulator/demodulator and radio frequency transceiver circuitry to transmit and receive digital data on the cellular system's data path. This causes transmission 221 through the cell system data path on RF carriers of TCP/IP digital data packets bearing the appropriate URL of the web page to be retrieved to be generated and encapsulated in packets for the 2G, 2.5G or 3G transport protocol by the communication interface software and hardware 118/185 in FIG. 6. The cell system transport protocol software strips off the encapsulating packets and transmits the TCP/IP packets to a web server 146. The web server 146 responds by encapsulating the HTML document of the requested web page in TCP/IP packets and sending it back to the cell system. This exchange across the internet is symbolized by arrow 223.

Data packets bearing the HTML document of the requested web page are then encapsulated in packets of the transport protocol of the cell system data path and transmitted back to the cell phone on and RF carrier. The RF carrier is received, demodulated and depacketized and error corrected by the communication interface 118/185, and the requested HTML document is then returned to the kernel 160. The kernel then returns the data of the HTML page to the microbrowser 169 in FIG. 5 by making an API call and sending the data of the HTML document.

In most cases, the HTML document is all that is needed to accomplish the task since most tasks only need the text which is in the HTML document and do not need the graphics, audio or video files or flash presentations.

Step 228 represents the process of using the task workflow template to guide the process of searching through the tags of the HTML document to find the tags for elements from the page to be extracted. As each set of tags is found, that element of the page is extracted and stored for display. Usually the element is text, but it can be a form to collect user input data or other types of elements also including any type of element that can be displayed on the page. This allows advertisers who wish to include messages in the information displayed as part of tasks to get elements containing their message into the display resulting from execution of a task workflow template. Step 228 represents the searching for every set of tags specified in the task workflow template for the web page whose HTML document was retrieved. More than one web page may be involved in a task though.

Step 230 represents the process of determining from the task workflow template whether there are any more web pages that need to be retrieved and filtered as part of the task. If there are, processing returns to step 226 to retrieve the next web page's HTML document and then step 228 is performed again to find and extract the information from the HTML document just retrieved. After all necessary information is extracted, step 230 is performed again to determine if another page needs to be processed. This loop continues until no more pages need to be retrieved to accomplish the task. Once all pages have been retrieved and processed, processing exits to step 232 to display the extracted information. This is done by sending the extracted data to the kernel 160 with an API function call to display it. The kernel then sends it to the display driver with an API call and the data is displayed on display 112.

Traffic on the internet is cut down by this mechanism because, even though the web page identified in the URL has many files associated with the various elements of the page such as graphics, audio, video, flash, cascading style sheets, etc., only the HTML document defining the structure of the page is requested and returned thereby preventing transmission of requests for all the other files that make up the page and transmission of those files to the phone.

Specific Example of a Task to Obtain Stock Quotes

More details of a specific example of processing several web pages to get stock quotes follow. An understanding of some terminology will help in understanding this example and the figures that illustrate it.

Tasks are encoded in task workflow templates and lead the user through one or more steps that users would normally take on a web site to accomplish something useful. Tasks encapsulate all the steps of an activity into a single concise workflow.

Steps: tasks are made up of one or more steps. Each step represents a web page that a user would navigate to/through while accomplishing a task. Each step has an HTML document that associates the related HTML web page with the step. Upon execution, the HTML document fetches the web content for the step. Each step is displayed on the microbrowser in the order of execution. At each step, data from the HTML document is extracted and displayed. This data can be informational text from the step's web page, a form for submission of user input data, links to other web pages, etc.

Modules: data from a step's HTML or XHTML document is extracted and displayed by one or more modules for the step. While a step is executing, all modules of that step execute in order. Modules are components for a step that can incorporate user input, information display, conditional branching, etc. The general objective of each module is to provide the user with information on the display or collect information from the user (or the user presets) and pass execution under the correct conditions to the next step if any next step exists. Each module has one or more items associated with it. Presets can be stored locally on the client computer or in the task workflow templates on the template server if each user has his own set of task workflow templates stored on the template server.

Items: each step has one or more items associated with it. An item is a leaf component that provides a single display item, form element or conditional expression.

Locators: modules and items both have optional locators. Locators are parsers that take instructions on how to parse through the HTML or XHTML document for the step and extract results. Locators are the means by which items extract the content the item is intended to extract from HTML or XHTML documents and render it for display. Locators can search through an HTML or XHTML document in many ways: by tags defined in the task workflow template; by physical position in the document defined in the task workflow template, by search string specified in the task workflow template, by regular expressions, etc. New, additional or custom locators can be "plugged into" task workflow templates to find valuable information through other means, perhaps even through artificial intelligence.

FormActions: form modules have FormActions associated with them. FormActions define how to convert the form data into a submission to a web site for the next step in the task. A FormAction which performs an HTTP FormGet, post or other HTTP operation to submit data to a web site is defined in the teachings of the invention. A FormSubstitutionAction which dynamically produces a URL for submission to the web site by substituting token in a template with values from the Form Module's Form Elements is defined. Any means for submitting data to web sites may be used to supply form data to servers which serve web pages from which forms were extracted.

Configuration Files are a synonym for task workflow templates. Each task workflow template is associated with one task. Task workflow templates are text documents that define a task and contain a description of the task and its related steps, modules, items, locators and other operational descriptors.

Stock Quote Task Processing

Figure 8:
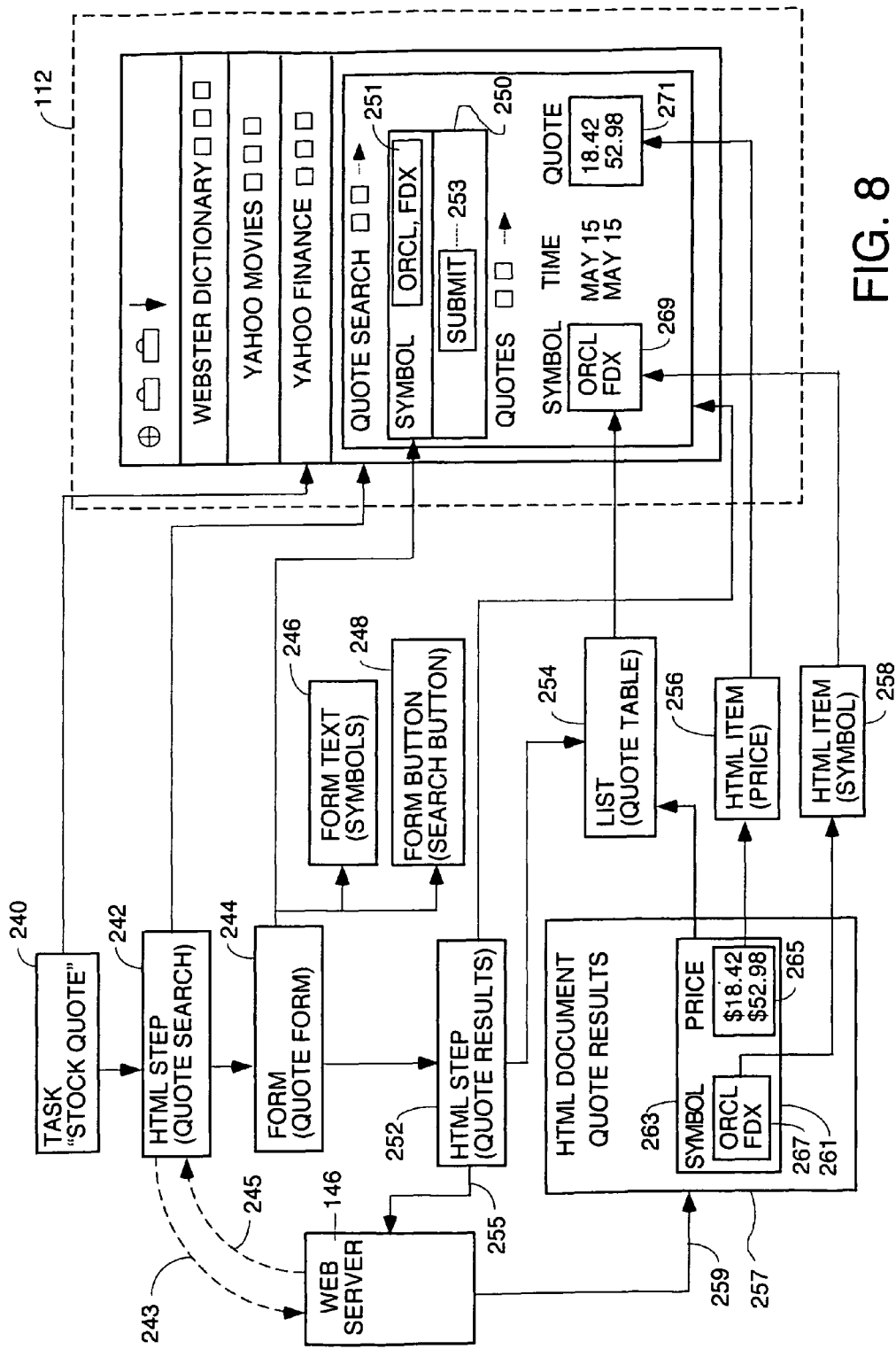
FIG. 8 is symbolic diagram showing a flowchart of the processing carried out to process a task workflow template called "stock quote" and the resulting displays on the cell phone and computer to solicit input and show the stock quote results.

FIG. 8 is symbolic diagram showing a flowchart of the processing carried out to process a task workflow template called "stock quote" and the resulting displays on the cell phone and computer to solicit input and show the stock quote results. The process will be discussed with joint reference to FIGS. 5, 6, 7 and 8. The process starts out at step 240 with the user selecting the task "stock quote" from the list of tasks. This causes the kernel 160 to cause the stock quote task workflow template to be loaded from storage 181 into DRAM 106 in the manner described in step 224 in FIG. 7. The task may have a firststepid attribute which contains the ID of the first step in the task to be executed, but if not, the first step in the task is executed.

The task "stock quote" only has two steps. The first of these is step 242 which is named "quote search". The second step 252 is named "quote results". The "Quote Search" step 242 represents the Yahoo!™ Finance web page and its execution results in the microbrowser sending an API call to the kernel requesting it to fetch the HTML document for the Yahoo!™ Finance web page. The causes the process described in step 226 in FIG. 7 to be performed which results in the HTML document for the Yahoo!™ Finance web page to be requested and returned and stored in DRAM 106 for further processing, as symbolized by request 243 to web server 146 and HTML document return 245 in FIG. 8.

Step 242 has a "quote form" form module 244 in it which functions to invoke a search of the HTML document of the Yahoo!™ Finance page for a "symbols" form and a search for a "submit" form. Both of these form elements are on the Yahoo!™ Finance page and serve to request user input to guide further processing. The "symbols" form element requests user input as to identify which stock by their ticker symbols for which stock quotes are to be obtained. The "submit" form element is a form on the Yahoo!™ Finance page in the form of a search button which the user clicks on after he or she has entered the symbols of the stocks for which stock quotes are desired. A form module in the microbrowser finds a form on a web page from the form's tags and renders the form on the display of the cell phone or computer using the microbrowser.

The microbrowser "stock quote" task is designed to strip out all the other elements of the Yahoo!™ Finance page except for these two ticker symbol and submit form elements and display only these two form elements on the display of the cell phone, laptop or desktop computer using the microbrowser. To do this, the Form Text item 246 and Form Button item 248 in the "stock quote" task workflow template are executed. Each module may have one or more items associated with it which are leaf components that use their locators to search for a single display item, form element or conditional expression. These items control the microbrowser to use their locators to search through the Yahoo!™ Finance HTML document to find the tags on the HTML document of the Yahoo!™ Finance page which enclose the "symbols" form element where the user enters information to identify the stock symbols of interest and the tags which enclose the "submit" form element command button, which when clicked by the user will cause the symbols the user entered to be sent back to the Yahoo!™ Finance web server to get quotes for the stocks of interest. The items 246 and 248, after locating these tags, extract the form elements that describe how to render the symbols form 251 and submit button 253 in FIG. 8 and store this information in the microbrowser cache. The microbrowser uses this extracted data to display the symbols box 251 and the submit button 253 on the display of the cell phone or computer. This display rendered on the cell phone display by the microbrowser of these two form elements extracted from the Yahoo!™ Finance page is symbolized by block 250 in FIG. 8. This rendering is done by sending an API request to the kernel from the microbrowser asking the kernel 160 to render a symbol box in accordance with the HTML element extracted from the Yahoo!™ Finance HTML document. The OS has its own rendering tools to render such forms and makes an API call to the display driver to cause the display driver to render the symbol box on display 112. In other words, the kernel has its own tools to render on the particular cell phone or computer things that are defined for display within form tags of the HTML document of any web site. The same mechanism applies to rendering of the submit button 253.

The symbols box 251 lets the user of the cell phone or computer type in the ticker symbol(s) of the stock of interest. This is done by the keyboard driver sending the symbols the user typed into the symbol box to the kernel in an API call. The kernel 160 then passes this data to the microbrowser which sends the completed form with ticker symbols back to the web server which sent the Yahoo!™ Finance page HTML document in the first place. This is done by HTML step 252 discussed further below.

Presets may be used also so the user does not have to type stock symbols or other user input into displayed forms if, for example, the user wants to frequently check the values of the same stocks. The task workflow templates may automate steps so that they are completely invisible and happen automatically without any rendering of forms, etc. on the client computer display. For example, if the user makes the same stock quote search frequently, a task workflow template can be set up which automatically does the whole search without the need for the user to type in the stock symbols. The task workflow template in this example would fetch the HTML document for the Yahoo! finance page, find and extract the symbol form, fill it in with presets for the ticker symbols for the desired stocks and sends the filled in form back to the server and then extract the requested quotes from the resulting web page and display them. In this task workflow, the only the thing that is rendered after launching the task is the actual stock quotes of the stocks whose symbols were entered by presets. The task workflow templates and microbrowser, in some embodiments, are structured to allow a user to go back to a previous step in a task workflow template, change the ticker symbols or other information used to fill in a form and submit the filled in form with the manually entered data to the server manually. In some embodiments, the forms and form elements can be pre-defined in the task workflow template so that the task workflow template does not even have to search for and extract the form from the fetched HTML or XHTML document. The pre-defined form from the task workflow template can simply be displayed on the client computer and the filled in form submitted to the appropriate server after the user has filled it in. This speeds up performance.

The submit button 253 can be selected by the user of the cell phone to indicate she is done entering ticker symbols and would like the quotes for those stocks.

The processing to search the HTML or XHTML document for these form elements and display them is symbolized by step 228 in FIG. 7. The form module 244 searches the HTML or XHTML document with its locator to find a form open tag which indicates the location in the HTML document for the Yahoo!™ Finance page of the form to enter the ticker symbol of a stock of interest. A form element on a web page is indicated by the tags <form> . . . </form> where <form> is the opening tag, the ellipses represents the content and </form> is the closing tag. The form may contain any web content (text, images, tables and so on), but its function is to be a container for a number of controls (checkboxes, menus, text entry fields, buttons and so on) used for entry of information. It also has the attributes for interacting with the form processing program. There can be several forms in an HTML or XHTML document but they cannot be nested nor can they overlap. When the user completes the form and clicks on the submit button, a normal browser takes the information, arranges it into name/value pairs, encodes the information for transfer (spaces and other characters not permitted in URLs are converted to their hex equivalents), and then sends it off to the server. The microbrowser does the same things with the information in the form after the submit button has been clicked.

Form elements have action attributes that provide the URL of the program to be used for processing the form element and they have a method attribute. The method attribute specifies one of two attributes, get or post, for submitting the form information to the server. Form information is typically transferred in a series of variables with their respective content, separated by the ampersand. The name attributes of form control elements provide the variable names. The content the user enters makes up the content assigned to the variable. With the get method, the browser transfers the data from the form as part of the URL itself (appended to the end and separated by a question mark). The post method transmits the form input information separated from the URL, in essentially a two-part message. The first part of the method is the special header sent by the browser with each request which contains the URL from the form element combined with a statement that this is a post request. The second part of the message is the actual form data. Long complex forms are best sent by post method. The microbrowser acts like a regular browser in this regard and can use both methods.

Form elements from the HTML document (as is the case with other elements) are found by the form module 244 using a locator. A locator is a parser which uses the description in the module of the element to be found to move a cursor through the HTML document systematically and read the tags at each cursor location. When a tag matching the description of the element to be found is located, the locator copies the tag and its contents and stores it in a cache of stuff extracted from the HTML document being built by the microbrowser. Locators find the right element in any one of many different ways. They can look for matches in tags, regular expressions, blocks, sub-blocks, attributes, etc. The microbrowser then does with that information whatever is necessary to accomplish the task.

When the kernel returns the ticker symbols the user entered in the symbol box 251 (ORCL and FDX) to task 240, the task controls the microbrowser to understand that execution of the form module 244 has resulted in return of information from the user. The form module 244 has a nextstepid attribute in it that is used to identify the next step to be performed in the event user input data arrives as a result of processing by form module 244. The nextstepid attribute identifies step 252 as the next step to be performed in the task.

Step 252 is a step module which functions to retrieve the Yahoo!™ Finance web page which results when a user enters a ticker symbol on the Yahoo!™ Finance home page and clicks the submit button asking for a stock quote on that symbol. Line 255 represents the sending of the ticker symbols ORCL and FDX to the Yahoo!™ Finance server in a message asking for stock quotes on those two stocks. This cause the HTML document 257 showing the structure of the resulting web page which includes these two stock quotes to be sent from web server 146 to the cell phone, as represented by line 259. This web page has many things on it besides the text of the actual stock quotes requested including numerous links to other articles, tabs that represent links to other web pages, graphics such as the stock price history chart, etc. The task workflow template defines the task for this example as the user only being interested in the text for the ticker symbols requested and the current price for those stocks. That text is shown in box 261 representing just the relevant portions of the HTML document containing the actual stock quote. The rest of the unnecessary stuff on the stock quote HTML document 257 is not shown.

Step module 252 includes three other Item Modules 254, 256 and 258 that function to locate the relevant stock quote textual information in the HTML document 257. These Item Modules use their locator parsers to look for tags described in the step module 252 that enclose the ticker symbols for which quotes have been obtained and which enclose the quotes themselves. A list module can extract any data including but not limited to HTML ordered/unordered lists (the <ol> and <ul> HTML tags). A list module can extract list-like data from any arbitrary HTML content/constructs The List Module 254 has a locator in it which uses descriptive information in the List Module to find tags in HTML document 257 that locate the locator's cursor at point 263. A list has a tag in whatever form is used for enclosing a list element. The List Module has a description of this tag and has other information that the locator uses for search purposes to make sure it found the correct list, such as the list contents must contain the string "orcl" in it somewhere. Each locator has cursor movement instructions and read instructions which cause whatever is located at the position of the cursor to be read. In the case of List Module, 254, the locator has an instruction to move the cursor to tag=list. That results in the cursor being moved to point 263. In this example, only one list will exist in the returned HTML document so the tag <list> will enclose the only list in the HTML document. In other examples, the returned HTML document might have two or more lists, so the locator might have instructions to find the first list tag and then search the contents of the list for a match to some string such as ORCL to make sure it had the right list.

Next, Item Module 256 executes. Each item in the list of stock quotes in the HTML document returned by the Yahoo!™ Finance server has a tag which is in some form such as <LI> . . . symbol . . . </LI> which encloses the stock symbol. The HTML document 257 contains only stock quotes for ORCL and FDX because those were the only quotes requested, so the only two items in the list of stock quotes returned will be the symbol ORCL and a quote for ORCL and the symbol FDX and a quote for FDX. The Item Module 256 (price) has an instruction to move the cursor to tag=LI and an instruction to read the contents of this tag. This tag LI will enclose the first list item on the list. This locates the cursor at the point 265 in HTML document 257. The read instruction of Item Module 256 then extracts the first price found in the list for ticker symbol ORCL and copies that price ($18.42) into the microbrowser cache.

Next, Item Module 258 is executed. Item Module 258 uses its locator to find tags in HTML document 257 by executing an instruction to move the cursor to tag=LI and read the contents of that tag. This causes the locator to locate the cursor at point 267 in the document and read the contents of that tag. Item 258 then extracts the first symbol on the list (ORCL) and stores the symbol in the microbrowser cache. After item 258 finishes executing, it sends processing back to list item 254. The list item 254 then iterates by executing list items 256 and 258 again. These list items then use their locators to locate the LI tags that enclose the FDX symbol and its price ($52.98) and read the contents of those tags so as to extract the FDX symbol and its price and store that information in the microbrowser cache.

The list module 254 will iterate executing the item modules 256 and 258 until they fail to find data meaning they have reached the end of the list.

The microbrowser then uses that extracted information to send an API request to the kernel requesting it to render the display shown as boxes 269 and 271 on the cell phone display 112 and sends the extracted data to the kernel. The kernel then makes an API request to the display driver 187 and passes it the extracted data for rendering on the cell phone display.

The quote result step 252, by moving the cursor directly to the <list> tag, skips over all the other images and other structure of the web page which is not needed and go directly to the spot on the page which contains needed information and extracts it.

An example of how this technology can be used to plan a vacation by visiting multiple sites would be as follows. A first step would be display of a form that asks the user where he wants to go and when and when he wants to return and receives the input. The next step could be a submission of the town where the user wants to go to a website that provides closeby airports. The list of airports extracted from the website is displayed and the user picks one. That airport selection and the date the user wants to go and return is then submitted to an airline reservation website such as kayak or orbitz and a list of possible flights is extracted and displayed. The user picks one and that information is sent back to the server which then sends several pages to complete the reservation and payment process. The task workflow then sends information about when the user wants to arrive and depart to a hotel booking website and extracts data about the possible hotels where the user might want to stay and displays the data. The user then picks a hotel and this information is sent back to the hotel booking site. Several pages are then sent and forms are displayed to user data to complete the reservation and payment thereof. The task then sends information about when the user wants to arrive and depart to a car rental booking site and extracts possible car deals and displays this information. The user's selection is sent back to the server and several other pages are sent and forms extracted and displayed for the user to enter information to complete the reservation and payment thereof. The task may then go to other websites to check the weather and things of interest the user might want to do in the area being visited and extracts that information for display.

As Appendix A shows, there are many different cursor movement commands and many different locator commands to cause locators to find various elements in the HTML document in different ways such as searching for a match on a user specified string. One way of finding and extracting a structural element is to move the cursor to the general location in a document of an element by executing a cursor movement command, and then executing a locator command that causes the locator to search for a specific string of text.

Appendix A contains definitions of the various types of modules and their attributes, a list of cursor movement commands, a list of read instructions, a list of write and skip instructions and a list of document bounding instructions and the format of configuration files.

Caching

The microbrowser implements a number of caching techniques to improve performance and reduce memory usage in the preferred embodiment. These techniques are not critical nor are they necessary. They are only preferred. These techniques are:

1) Task workflow templates are cached on the client computer.

2) Task workflow templates are also cached, i.e., separated out or tagged for quick retrieval, for each user account on the template server if the task is being executed on the template server.

3) HTML document are early cached, meaning they are downloaded (possibly even if a separate process thread) as soon as the task workflow template is loaded into memory for execution.

4) HTML documents fetched by a task workflow template can be cached after they are first downloaded so that they do not have to be downloaded again the next time the task is run. HTML documents can be optionally refreshed each time the task step calling for fetching that HTML document is executed or each time it is viewed.

5) Portions of the HTML file may be stored in the local cache (on the cell phone, client computer or template server) such as HTML forms and form elements. This means the forms so cached can be rendered and submitted without having to first load any HTML from the server.

6) Values to be filled in on the form elements can be presets which are stored in the local cache of the client computer, cell phone or template server so that form elements can be pre-populated with preset data.

7) After an HTML file is loaded and parsed, the data values are extracted, the data values are temporarily cached (throughout the user session) so that they do not need to be re-loaded from the web server on each viewing. This allows for very fast navigation among various tasks and steps within a task without requiring a reload of the HTML document. This allows for the extracted data to be used as "variables" and "values" throughout the microbrowser for other tasks, scripts, programs and applications.

8) The microbrowser, in the preferred embodiment, has intelligence built in to determine when all cached data has to be refreshed, including task definitions (task workflow templates), HTML documents, item data values, etc.

9) Once data values have been extracted, the original HTML document is discarded to free up memory for other purposes.

Figure 9:
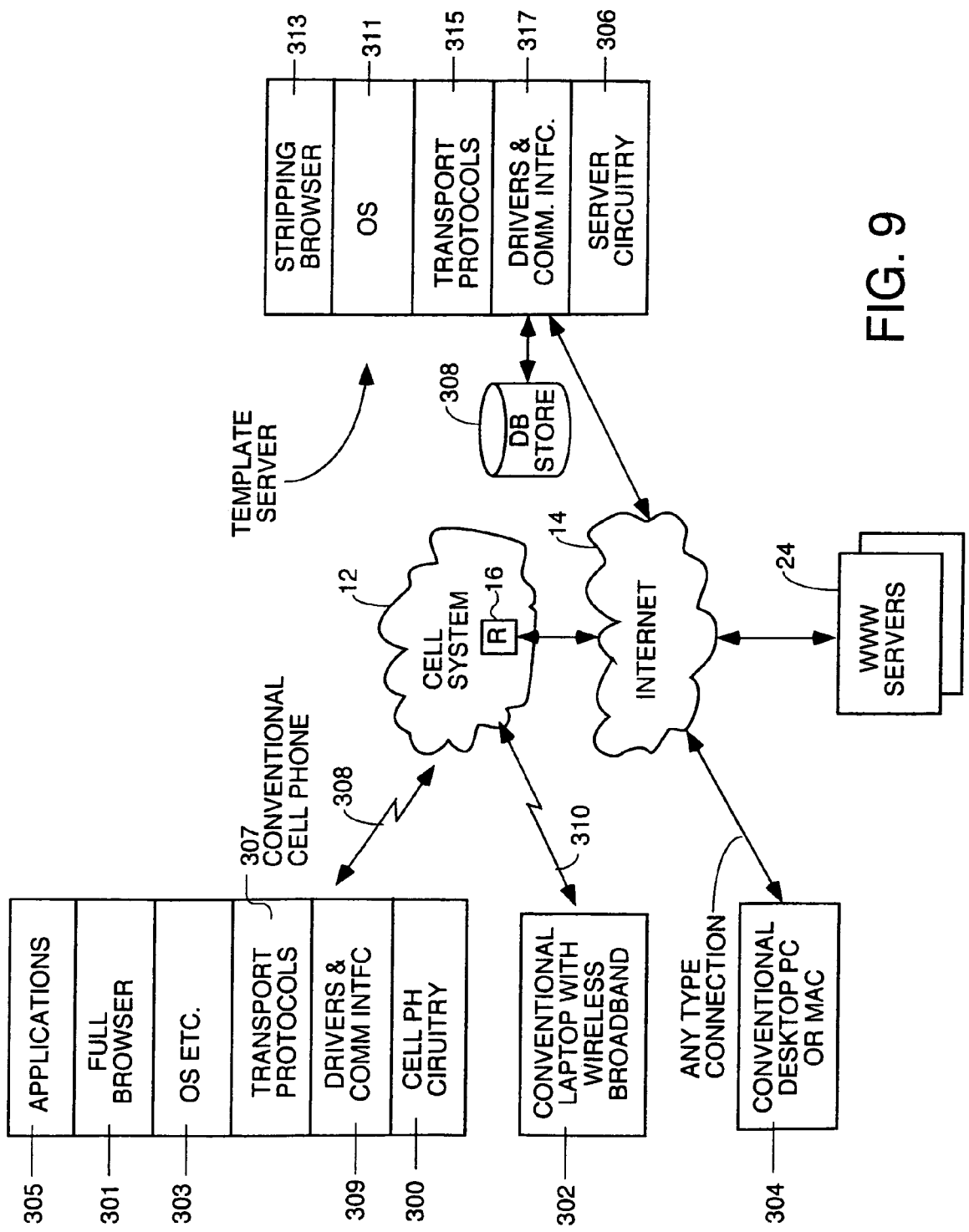
FIG. 9 is a block diagram of an alternate system architecture where the microbrowser is resident on and executed by the template server and sends stripped web page results to conventional cell phones, laptops and desktop computers running full browsers.

System Architecture where Template Server Acts as Proxy Server and Executes the Microbrowser FIG. 9 is a block diagram of an alternate system architecture where the microbrowser is resident on and executed by the template server 306 and sends stripped web page results to conventional cell phones 300, laptops 302 with wireless broadband internet access cards and desktop computers 304 running full browsers. In the system of FIG. 9, each of the cell phone 300, laptop 302 and desktop PC or Mac 304 is a conventional device with no special hardware or software. Each does have to have a browser program and that is shown at 301 on the cell phone but the other computers 302 and 304 do not separately show their browsers. Cell phone 300 also has a kernel OS 303, other application programs 305, transport protocol software 307, drivers and communication interface 309 and conventional cell phone circuitry which the software controls.

The cell phone 300 and the laptop 302 (if it has a cellular system broadband internet access card) each are connected to the internet through the radio frequency carriers 308 and 310 and the cellular system's internet access data path 12 which includes a router 16 which couples devices in the cellular system such as phone 300 and laptop 302 to the internet 14.

Also coupled to the internet are a plurality of servers 24 that serve web pages of various services like airlines, hotel chains, etc.

Also coupled to the internet is a template server 306 which has conventional hardware circuitry such as that shown in FIG. 2 or some subset thereof and is programmed with an operating system 311, a microbrowser 313, transport protocol software 315 such as a TCP/IP stack and drivers and a communication interface 317 to couple the server to the internet 14.

Figure 10A:
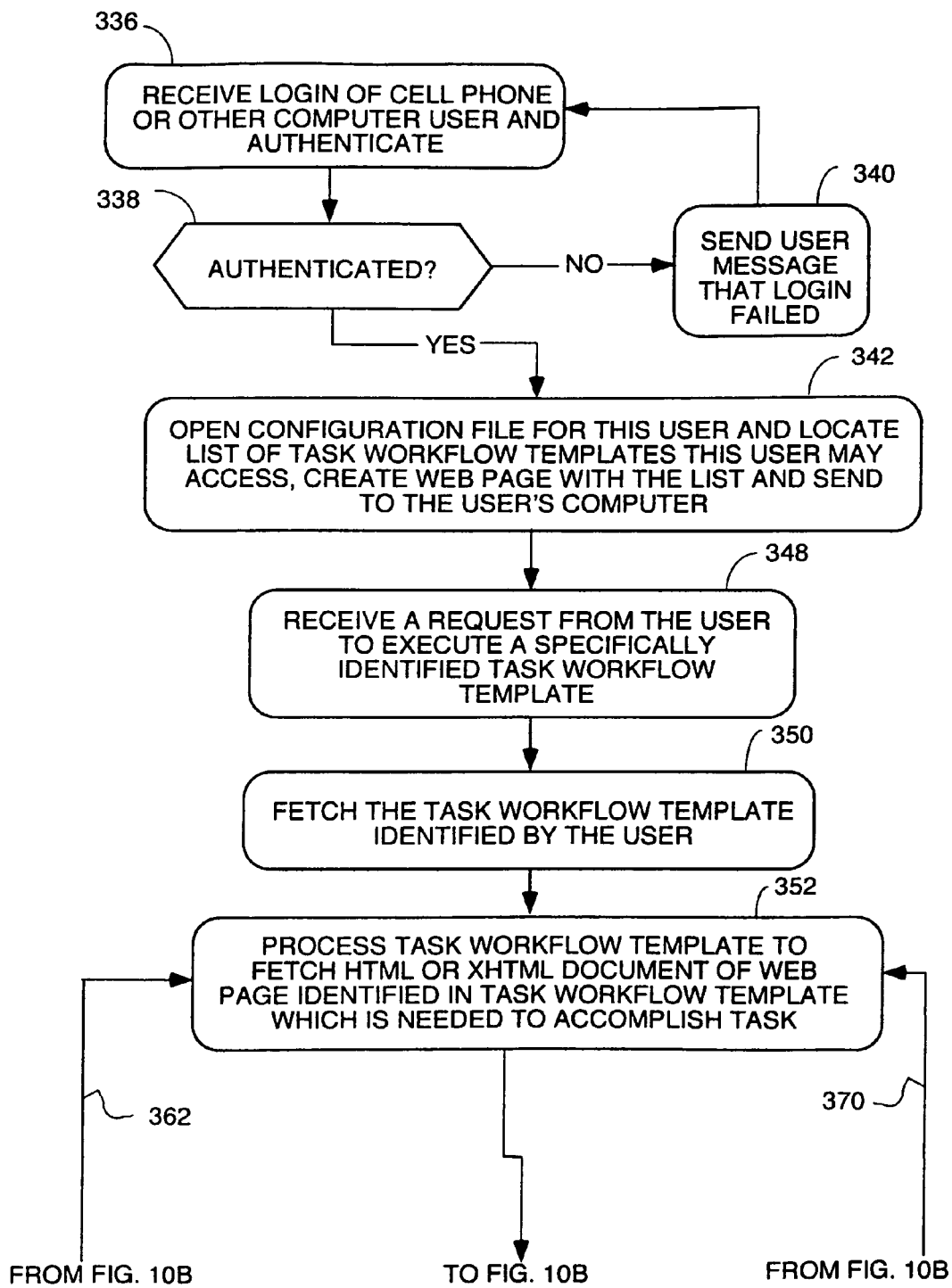
FIGS. 10A and 10B are a flowchart of the process carried out by the template server 306 acting as a proxy server.
Figure 10B:
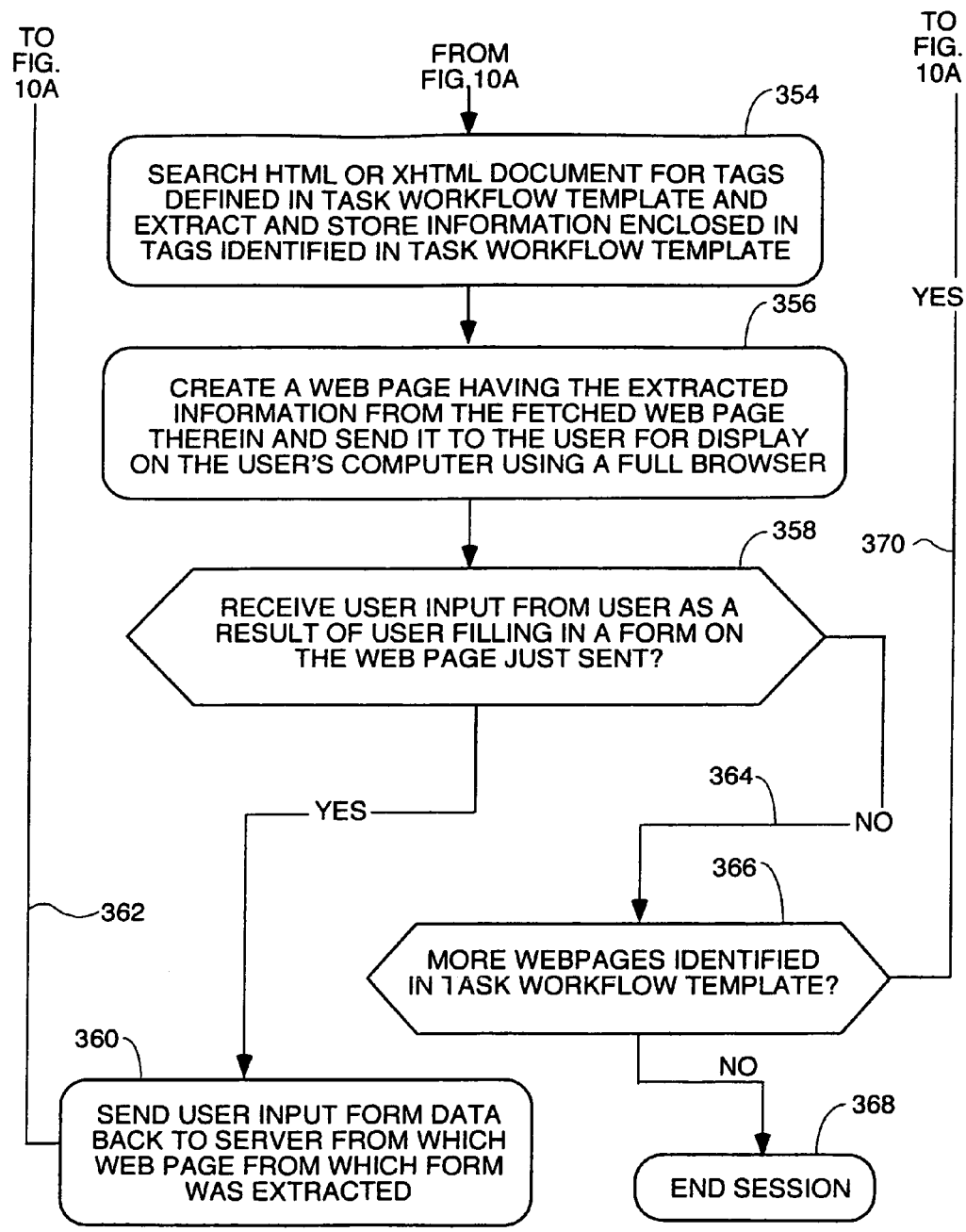
Figure 11A:
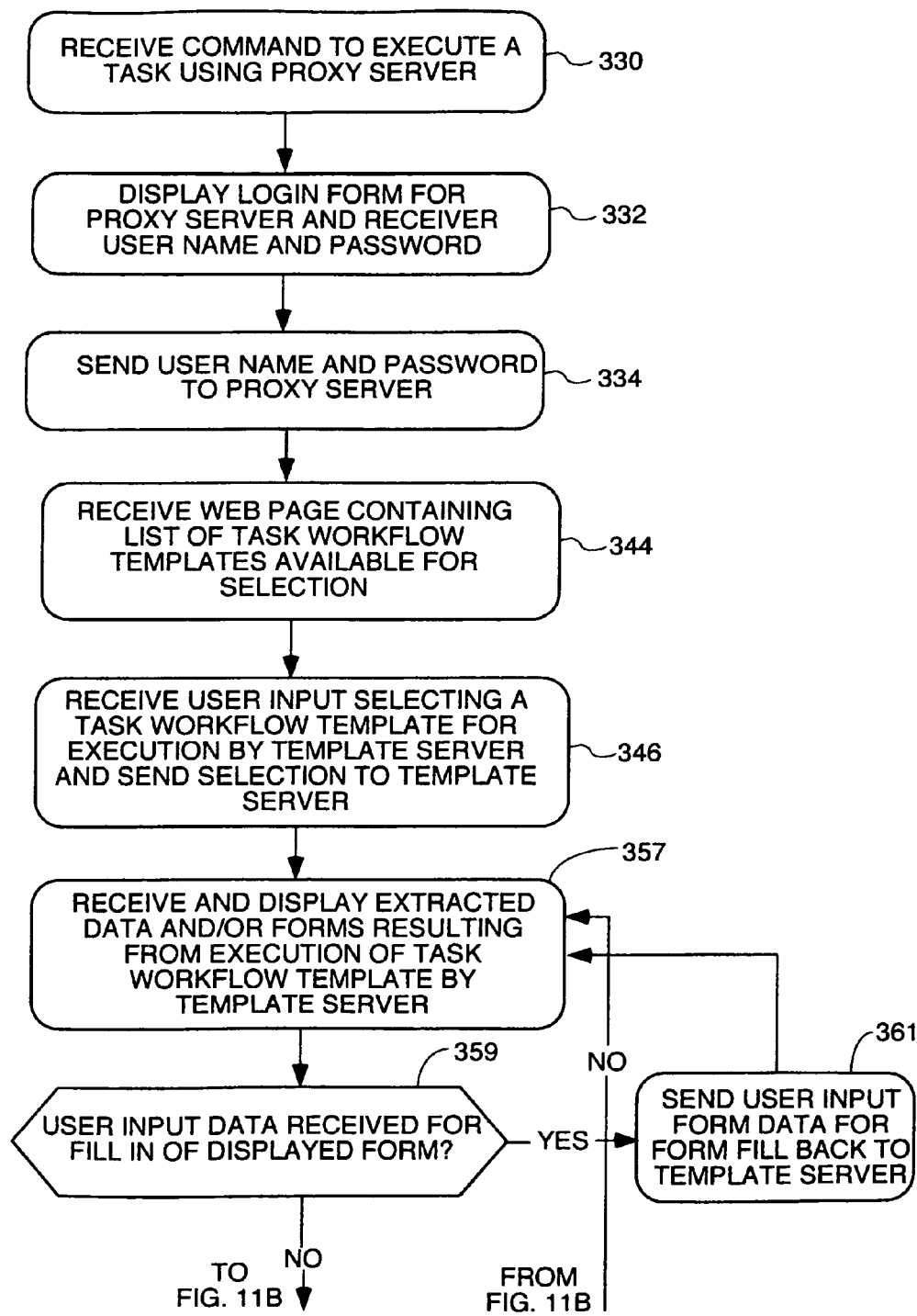
FIGS. 11A and 11B are a flowchart of the process carried out by the cell phone, laptop or desktop computers in the proxy server system architecture of FIG. 9.
Figure 11B:
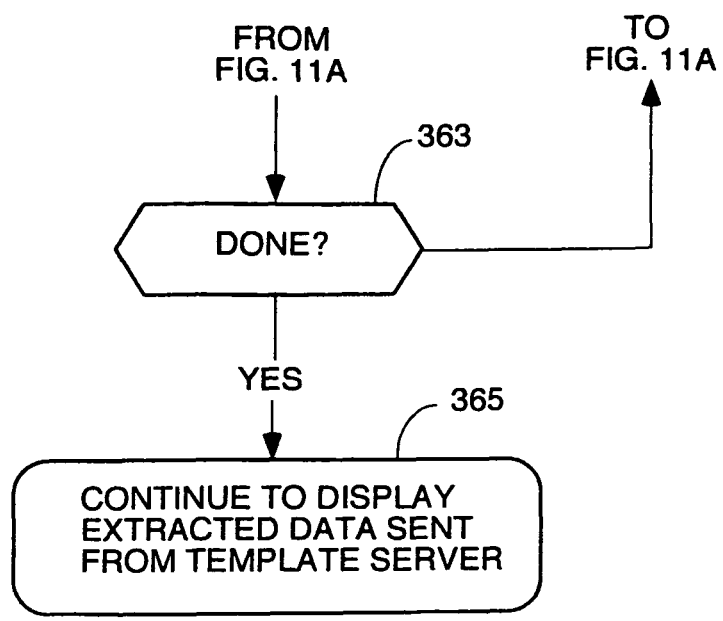

FIGS. 10A and 10B are a flowchart of the process carried out by the template server 306 acting as a proxy server. FIGS. 11A and 11B are a flowchart of the process carried out by the cell phone, laptop or desktop computers in the proxy server system architecture of FIG. 9. The process of using the template server as a proxy server will be described with joint reference to FIGS. 10A, 10B, 11A, 11B and 9.

Basically the process entails using a cell phone, laptop or desktop having a full browser to select a task workflow template stored on template server 306 and causing that task workflow template to control processing of a microbrowser to control processing by the template server 306. Under control of the microbrowser, the template server retrieves the HTML or XHTML files of one or more web pages and extracts the information specified in the task workflow template. That extracted information is then sent to the phone running the full browser as a web page and the phone, laptop or desktop computer which invoked the task workflow template then displays the extracted information. If the displayed information is a form, the user using the phone fills in the needed information and that is sent back to the template server 306 which sends it to the web server which originally supplied the web page from which the form was extracted. That causes the web server to respond by generating a new web page with new information on it pertinent to whatever user input data the user entered. The template server 306, under control of the task workflow template, then retrieves the HTML or XHTML document of the new web page generated by the web server and extracts the pertinent information out of that document by finding the tags described in the task workflow template and extracting the information enclosed by those tags. The extracted information is then included in a web page and that web page is sent to the cell phone, laptop or desktop computer for display by its full browser.

The process starts at step 330 in FIG. 11A where a command is executed on the cell phone, laptop or desktop computer (hereafter just referred to as the cell phone) that indicates the user wants to execute a task using the proxy server. In step 332, the user login form is displayed on the phone. The user responds by typing in her user name and password for her account on the template server. That user name and password are sent to the template server in step 334. This results in step 336 in FIG. 10A being performed on the template server to receive the user name and password entered on the phone. Step 338 authenticates the user, and if the user is not authenticated, step 340 sends a message back to the user that authentication has failed and returns processing to step 336 to await receipt of new username and password information from any user.

If the user is authenticated, step 342 opens a configuration file for this user and locates the list of task workflow templates to which this user may have access. Subscriptions to task workflow templates can be implemented in this way should that become part of the business model. Otherwise, the list of all available task workflow templates is sent to the user or just task workflow templates in a user selected area of endeavor may be sent if there are tens of thousands of available task workflow templates. Step 342 also represents the process of creating a web page with the list of task workflow templates this user may access and sending that web page to the user.

When the phone receives the web page containing the list of task workflow templates which the user may invoke, that web page is displayed on the phone in step 344 on FIG. 11A. Step 346 represents the process of receiving user input selecting a task from the displayed list of task workflow templates for execution by the template server and sending the selection to the template server.

The template server receives the request to have a particular task workflow template executed in step 348 in FIG. 10A. This causes the template server in step 350 to fetch the task workflow template identified by the user from storage 308 in FIG. 9. Typically, the task workflow template is stored in DRAM or main memory after being fetched for faster execution.

After the task workflow template identified by the user has been fetched, execution of it begins on the template server 306, as symbolized by step 352. The task workflow template controls microbrowser 313 in FIG. 9 to make the appropriate function calls to the operating system 311 to fetch the HTML or XHTML document of the first of what may be one or more web pages needed to accomplish the task the template workflow template is designed to accomplish. The HTML document is stored in main memory of the server 306 for further processing by the microbrowser to extract the information specified by the task workflow template. Step 354 represents the process of searching the HTML or XHTML document for the tags that are defined in the task workflow template which enclose the information from the web page needed to accomplish the task. After the tags are located, the information they enclose is extracted and stored in memory by the template server 306. The process of executing the microbrowser under control of the task workflow template is exactly as previously described except that it is done on the template server and not the cell phone so the extracted data needs to be sent to the cell phone.

In order to send the data extracted from the HTML or XHTML document to the cell phone, a web page is created by template server 306 and the extracted data is put into this web page and the web page is sent to the cell phone for display. That process is represented by step 356.

Execution of step 356 on the template server results in execution of step 357 (FIG. 11A) on the cell phone. Step 357 represents the process of receiving the web page with the extracted information from the template server and using the full browser on the cell phone to display the web page.

Sometimes, as is the case for the stock quote example previously described, the extracted data is a form which requires the user to fill in some data such as which ticker symbols for which stock quotes are desired, or what is the desired city and data of departure. Test 359 determines is the displayed data is a form and if the user has filled in any user input data. If so, step 361 sends the user input data filled in by the user on the form back to the template server and processing returns to step 357 to receive new web pages of data extracted from other web pages by the template server. The phone will stay in this loop of step 357, test 359 and step 361 until the web page sent from the template server with extracted data has no form on it or the user does not fill in any input data.

If the user does not fill in any user input data, processing proceeds to test 363 to determine if the processing of the task workflow template is done, and whatever data that the template server has extracted and sent will continue to be displayed in step 365. Steps 363 and 365 can be eliminated in some embodiments and step 359 will transfer processing to a step which ends the process when test 359 determines that the user has not entered any user input data.

Returning to the consideration of FIG. 10B, step 358 is a test performed on the template server which determines if any user input has been received from the cell phone as a result of a user filling in a form extracted by the template server and sent to the cell phone for display. If the user has filled in some form data and it has been sent back to the template server, step 360 sends that user input form data back to the server which generated the web page from which the form filled in by the user was extracted. Processing then proceeds via path 362 back to step 352 to process the task workflow template to fetch the HTML or XHTML document of a web page identified in the task workflow template. This will be the web page which the server from which the form was extracted will generate when the form data is filled in and sent back to the server which generated the form.

If test 358 determines that no user input data was entered as a result of a user filling in a form that was extracted from a web page, processing proceeds along line 364 to test 366. This test determines if the task workflow template processing has been completed or if there are more web pages to fetch and process. If processing of the task workflow template is completed, step 368 is performed to end the request. If more processing remains to be done, processing proceeds along path 370 back to step 352 and processing continues from there as previously described.

Although the invention has been described in terms of the preferred and alternative embodiments, those skilled in the art will appreciate other modifications of the embodiments taught herein which will be within the spirit and scope of the invention. All such modifications are intended to be included within the scope of the claims appended hereto.

APPENDIX A

Overview

The micro-browser provides a consolidated workflow interface for fast, efficient navigation through web sites. Typical activities performed on the web, such as shopping, checking weather, etc. are made more efficient through three innovations. The first innovation is to limit the amount of information transferred from the web site to a phone. The second innovation packages the series of web pages that need to be visited to accomplish the activity into a single workflow. The third innovation makes phone navigation of web sites more efficient by saving user presets for steps along the workflow.

The first innovation limits the information transferred from the web site to the phone to the minimum set of data required to accomplish the task, by sifting out large volumes of unnecessary data (such as graphics and animations), which are subsequently not transferred to the phone. This means the web site content is obtained much more quickly and can be presented in a very concise, targeted manner.

The second innovation, by packaging the series of web pages that need to be visited to perform the activity, eliminates the need for the user to search through a series of web pages for the next step required to complete the task and get the desired content. The micro-browser has knowledge of what the next step to be taken is (along with the web page associated with that step) and automatically advances to that step as soon as it has the sufficient user input to proceed.

Finally, the third innovation of the micro-browser, by saving user preferences for each step, enables the activity to proceed without user data entry or selection. This automates and expedites the completion of the task without the time required for user interaction.

Tasks

User activities are encapsulated in Tasks. Tasks lead the user through the one or more steps that users would normally take on a web site in accomplishing a goal. For example, to buy a book on the web, a user may go to a web site, search for a book, look at the price and reviews, add it to a shopping cart, login, then checkout. Tasks encapsulate all the steps of an activity into a single, concise workflow. The micro-browser interprets this workflow, fetches the minimal set of information for each step from the web server (primarily text information), collects the requisite information from the user (storing preferences), and submits the results. This enables a Task to be executed much more easily (since all of the steps are preconfigured & common user preferences are stored in the Task) and much more quickly (since only the absolute minimum amount of data is transferred from the web server to the browser).

Steps

Tasks are made up of one or more Steps. Each Step represents a web page that the user would navigate to/through while accomplishing a Task. Each Step has an HTML Document that associates the related HTML web page with the step. Upon execution, the HTML Document fetches the web content for the Step. Each Step is displayed in the browser in order of execution. At each Step, data from the HTML Document is extracted and displayed in the browser for the user. This data can be informational text from the Step's related web page, a form for submission of user information, links to other web pages, etc. Data from a Step's HTML Document is extracted and displayed by one or more Modules for the Step.

Modules

While a step is executing, all Modules on that Step execute in order. Modules are components for a Step that can incorporate user input, information display, conditional branching, etc. The general objective of each Module is to provide the user with information (in the form of information display), collect information from the user, and pass execution (under the correct conditions) on to the next Step (if any exist).

Basic Modules include the Display Module for extracting and rendering one or more individual HTML content items from a Step's HTML Document, the List Module for rendering a list of HTML content items from a Step's HTML Document, the Form Module for rendering an HTML form for user data entry and submission, and the Condition Module (to-be-implemented) to branch to one or more subsequence Steps based on the evaluation of a conditional expression.

Items

Each Module may have one or more Items associated with it. An Item is a leaf component that provides a single Display Item, Form Element, or Conditional Expression.

Locators

Displays and Items both have optional Locators. Locators are parsers that take instructions of how to parse through the HTML text document for the Step and extract results. Locators are the means by which Items extract their related content from HTML web pages and render it for display.

FormActions

Form Modules have FormActions associated with them. FormActions define how to convert the Form data into a submission to a web site for the next step in the Task. Currently two types of FormActions have been implemented: FormAction which performs a straightforward HTML Form Get operation to submit the data to the web site; and, FormSubstitutionAction which dynamically produces a URL for submission to the web site by substituting tokens in a template with values from the Form Module's Form Elements.

Configuration Files

Tasks are defined in the system in Configuration Files. A Configuration File is text document that defines a Task. It contains the description of the Task and its related Steps, Modules and Items.

Configuration Files are loaded from the centralized content server and cached locally for quick execution.

Task Execution Lifecycle

Task Loading

The Task lifecycle begins with the Task being loaded by the user selection of the Task. Tasks are loaded from the local cache (on the phone). New Tasks can be downloaded from the TaskServer. When new Tasks are requested, they are downloaded to the client's local cache. From this point onward, the Tasks run independently of the TaskServer. However, the client will check on a periodic basis (configurable by the user) with the TaskServer to see if there have been modifications or updates to any of the Tasks cached locally.

When the Task is loaded into the client application from the SERVER??, all cached information for the Task is loaded from the cache and applied. This information includes pre-configured information for the Task that the user has entered and saved in the local cache. Note that all of this information resides exclusively on the client (the phone) and is not transmitted to the TaskServer. This allows the client to operate completely independently of the existence of the TaskServer. Is there an advantage to this (faster, more reliable, etc) When Tasks are loaded from the local cache into the client application, they receive a load request. This load request can be captured to automatically begin execution of the Task (see Task Execution infra).

Task Opening

When Tasks are opened for viewing, they process an open request. This open request can be captured to automatically begin execution of the Task (see Task Execution infra). A Task receives an open request each time the Task is selected for viewing after the user has navigated away from the Task (i.e. viewed a different Task). Upon return, the Task will receive the open request.

Using the Task open request enables the developer to cause the content of the Task to be refreshed at each viewing. For example, a stock quote viewing Task could be refreshed automatically each time it is opened. This way the user does not have to submit the pre-set list of stock symbols before viewing the results.

Task Data

Each time a request is submitted to view the Task, any data that is relevant to the Task is applied. Data for the Task includes any information received during the execution of the Task, such as information filled out in a Form and submitted to the Task.

Task Execution

Task execution involves processing the user request. Tasks are made up of Steps of execution. Only one Step is executed at a time; however, one Step's execution may in turn trigger the execution of another Step (and yet another, and so forth). For example, a Step may exist to collect data from the user in an HTML Form. When submitted, the Step containing the Form will be executed. However, the submission of the Form will cause the next Step containing the results from the request to be executed.

When a Step is executed, the Modules that belong to the Step will be executed. For example, a Step may contain a Form Module and a Display Module. As such, when executed, the Step will in turn execute both the Form and Display Modules in turn (in order of their definition in the Task's Configuration File). Execution of each Module will cause the text to be extracted for the Display Module and so forth.

Task execution can flow explicitly to an individual Module for a Step. For example, when a Form is submitted, the Task execution flows to the Form's Step, then to the Form itself, where the explicit execution request for the Form will cause the system to submit the Form and its content to the target web site. This targeted execution request will also cause the next Step in the Task flow (the Step that displays the results for the Form submission) to be executed. Task targeted execution can also be directed to an individual Item of a Module, such as to a single Link Item which, when explicitly executed, will cause the link to be submitted to the web server and the Step that contains the results from that link to be executed.

Each Step, Module or Item may set the nextstepid attribute to indicate which Step is the next Step to be processed in the execution flow when a targeted execute request has been received for it.

Tasks can set the firststepid attribute to indicate the first Step to be executed when no Step has received an explicit execution request (such as when the Task is first opened and the user has not caused any execution to take place).

Step, Module and Item components can set the executeonload attribute to true to cause them to receive a targeted execution request as soon as they are loaded in the local cache. Step, Module and Item components can set the executeonopen attribute to true to cause them to receive a targeted execution request each time the Task is opened up on the client for viewing.

System Components

Tasks

| | |
|---|---|
| Id | System wide unique identification number |
| name | Internal reference name |
| label | Display label |
| firststepid | First Step to be executed. If a value for firststepid is not provided, the first step in the Configuration File is treated as the first step for the Task. |

Steps

HTMLStep

The HTMLStep is currently the only type of Step that has been implemented. Each Step has an HTML Document that it refers to. Upon execution, the HTML content for the URL of the HTML Document is fetched and cached in the HTML Document for use by the Step's Module(s).

| | |
|---|---|
| taskid | ID of the Task the Step belongs to. If a taskid is not provided, the taskid of the Configuration File is used by default. |
| id | System wide unique identification number |
| name | Internal reference name |
| label | Display label |
| type | Type of Step (only HTMLStep has been implemented). Note that the type value must exactly match the case of the Step type that is intended. |
| executeonload | Auto-execute the Step when first loaded if it is in the execution chain [t/f(default)] |
| executeonopen | Auto-execute the Step on each user opening of it if it is in the execution chain [t(default)/f] |
| def | Attribute-value pairs separated by the '|' character. Values containing the '|' character should use the escape sequence &bar; in place of the '|' character. |

-continued

> These escape sequences will be replace with the '|'
> character when the def attribute is read. The format for
> the def attribute is:
> def = attr1 = value1|attr2 = value2|attr3 = value3
> The attribute-value pairs for the HTMLStep are:
> url        URL for the web site content for the Step
> loadhtml   fetch the HTML on Step execution [t/f]

HTML Document

HTML documents are dynamically created for each HTMLStep. HTML Documents are responsible (upon HTMLStep execution) for fetching the HTML content from the web site and caching it for reference by the Step's Modules and those Modules' Items.

The HTML Document acts like an OS File. It maintains a cursor of the current read position in the file. Locators can request the cursor to advance to a fixed position in the document or to a location representing a point of interest (e.g. a matching string indicating the location of a value of interest). The cursor can be reset to any arbitrary position in the document by any associated Locator. There may (and often are) many Locators concurrently reading from a single HTML Document. Single Task execution is single threaded, all reads by Locators are sequential, so overlapping reads are not an issue. However, Locator directives should be aware of the other readers that may come beforehand or afterward so that the cursor can be correctly positioned beforehand (if necessary) to ensure reading of the desired content, and so that the cursor can be correctly positioned afterward so that the following Locators' reads are successful. The order of Locator reads will follow the order of the Modules and Items that own the Locators.

Modules

| | |
|---|---|
| stepid | ID of the Step the Module belongs to If a stepid is not provided, the stepid of the most recently added Step in the Configuration File (the Step most closely preceding the Item in the Configuration File) is used by default. |
| id | System wide unique identification number |
| name | Internal reference name |
| label | Display label |
| type | Type of Module [List, Form, Display, Condition] Note that the type value must exactly match the case of the Module type that is intended. |
| order | The order of the Module in the list of Step Modules |
| executeonload | Auto-execute the Module when first loaded if it is in the execution chain [t/f(default)] |
| executeonopen | Auto-execute the Module on each user opening of it if it is in the execution chain [t(default)/f] |
| def | Attribute-value pairs separated by the '\|' character. Values containing the '\|' character should use the escape sequence &bar; in place of the '\|' character. These escape sequences will be replace with the '\|' character when the def attribute is read. The format for the def attribute is: def = attr1 = value1\|attr2 = value2\|attr3 = value3 The attribute-value pairs for the Modules are: |
| locator | The locator defining where to find the relevant HTML content in the HTML document for the List data; attributes: type Type of Locator to use [HTMLLocator] pattern Search pattern in HTML document to start |
| nextstepid | The next Step to branch to upon execution of this Module [results Step for a Form Module submission, web page content for a Display or List containing a Link Item that is clicked, etc.] |

Display

The Display provides simple display of individual HTMLItems for a step.

List

The List provides the display of HTMLItems in the form of a list of values. Each column of values in the List is defined by a single HTMLItem for the List. If defined to do so, the List will iterate through the HTML Document continually for each set of HTMLItems that make up a conceptual row in the List until no further row data is located.

| | |
|---|---|
| def | List-specific Module attributes: iterated Iterate through a list of HTMLItems rows [t/f] |

Form

The Form produces an equivalent of an HTML Form for submission of data to a web site. Forms replicate the HTML Form Elements found on the original web pages, including the names and values of the web pages HTML Form Elements. However, the action for the Form (where the form is submitted) is dynamically set to submit the Form back to the Task Engine. Upon submission, the Form is processed, and an equivalent Form submission is then submitted to the designated web site and the execution flow continues to the next Step as defined by the Form for processing the results of the actual web site submission of the Form data.

| | | |
|---|---|---|
| def | Form-specific Module attributes: | |
| | action | URL for the Form submission |
| | actiontype | Action type [FormAction/FormSubstitutionAction] |
| | method | HTML Form submission type [GET, POST] |
| | autosubmit | Auto-submit Form after user change of values |
| | concatvalues | Should multiple values for an Item be concatenated together in the submitted URL (item1=value1,value2 . . . ) or should name=value be repeated for each value (item1=value1&item1=value2&item1=value3 . . . ) [t(default)/f] |
| | urlvaluedelim | The delimiter for concatenating multiple values for an Item together (default=',') |

Condition (To-Be-Implemented)

Conditions receive the current state of the Step and make a branching decision to execute one of one or more subsequent Steps.

Items

| | |
|---|---|
| moduleid | ID of the Module the Item belongs to. If a moduleid is not provided, the moduleid of the most recently added Item in the Configuration File (the Module most closely preceding the Item in the Configuration File) is used by default. |
| id | System wide unique identification number |
| name | Internal reference name |
| label | Display label |
| type | Type of Module [List, Form, Display, Condition] Note that the type value must exactly match the case of the Item type that is intended. |
| order | The order of the Module in the list of Step Modules |
| executeonload | Auto-execute the Item when first loaded if it is in the execution chain [t/f(default)] |
| executeonopen | Auto-execute the Item on each user opening of it if it is in the execution chain [t(default)/f] |

| | |
|---|---|
| def | Attribute-value pairs separated by the '\|' character. Values containing the '\|' character should use the escape sequence &bar; in place of the '\|' character. These escape sequences will be replace with the '\|' character when the def attribute is read. The format for the def attribute is:<br>def=attr1=value1\|attr2=value2\|attr3=value3<br>The attribute-value pairs for the Items are:<br>valuedelim Delimiter for multiple Item values (default ',')<br>valuedelimregex Regular expression for locating valuedelim<br>valuedelimescape Escape sequence for valuedelim (default ,)<br>replacepattern Character string in value to be replaced<br>replacevalue Characters to replace replacepattern string with<br>optional Is locating the Item in the HTML document optional<br>(will skip if not found, not advancing HTML cursor) |
| value | Preset value for the Item of format:<br>value=value1,value2,value3,value4<br>(no spaces, escaping ',' character with ,) |
| nextstepid | The next Step to branch to upon execution of this Item [such as the Step to jump to to display the results of a Link Item that has been clicked] |
| locator | The locator defining where to find the relevant HTML content<br>in the HTML document for the List data; attributes:<br>type Type of Locator to use [HTMLLocator]<br>pattern Search pattern in HTML document to start |

HTMLItem

An HTMLItem represents a single string of characters found in the text from a given location. HTMLItems can have a Locator that describes how to locate and extract the desired text from the HTML Document. Once the desired text has been extracted, the HTMLItem displays the results in the micro-browser.

Link

A link to a URL to be pulled from an HTML Document and (upon clicking) submitted to a Step for fetching the HTML. A URL for the link can be manually provided by setting the url attribute to the full URL path (e.g. http://www.whitehouse.gov), or the URL can be automatically extracted from an HTML Document by simply using a Locator to move the cursor to the beginning of the related anchortag (<a>) in the HTML Document.

If a URL is provided through the url attribute, the label for the Link Item will be displayed, with the HREF for the link being the provided URL. If a URL is not provided, the Link Item will display the display text for the anchor tag in the HTML Document.

The Link Item's automated extraction of the URL and display text from the HTML Document can be overridden by providing the Link Item's Locator the instructions to extract both the URL and the display text. For example:
    locator=type=instructions=movetotag=a:setvar=url:
        readattributevalue=href:setvar=text:readblocktext When the URL and display text are populated by the Link Item's Locator, the Link Item will not auto-populate the URL and display text.

| def | | |
|---|---|---|
| | url | the URL to link to. If blank, the URL is automatically extracted from the HTML Document |
| | text | the text to display for the link. If blank, the text is automatically extracted from the text located within the anchor tag (between <a> and </a>) |

FormText
Standard HTML Form Text Input
FormHidden
Standard HTML Form Hidden Value Input
FormPassword
Standard HTML Form Password Input
FormSelectList
Standard HTML Form Selectlist Input

| def | Form Selectlist-specific Module attributes: | |
|---|---|---|
| | optionvalues | Selectable values. Format:<br>value=value1,value2,value3,value4<br>(no spaces, escaping ',' character with ,) |
| | optionlabels | Display labels for values. Optional.<br>If not provided, optionvalues values are used.<br>Format:<br>value=value1,value2,value3,value4<br>(no spaces, escaping ',' character with ,) |
| | shownull | Display (optional) non-value value<br>[t/f(default)] |
| | nullvalue | Value for optional non-value selection |
| | nulllabel | Display label for non-value selection.<br>Optional.<br>If not provided, nullvalue value is displayed. |
| | multiple | Allow selection of multiple values<br>[t/f(default)] |
| | size | Number of selection values tall to display<br>(default=1) |
| | maxselect | Maximum number of values that can be select<br>(browser support is limited) |

FormCheckbox
Standard HTML Form Checkbox Input

| def | Form Checkbox-specific Module attributes: | |
|---|---|---|
| | optionvalues | Selectable values. Format:<br>value=value1,value2,value3,value4<br>(no spaces, escaping ',' character with ,) |
| | optionlabels | Display labels for values. Optional.<br>If not provided, optionvalues values are used.<br>Format:<br>value=value1,value2,value3,value4<br>(no spaces, escaping ',' character with ,) |
| | shownull | Display (optional) non-value value<br>[t/f(default)] |
| | nullvalue | Value for optional non-value selection |
| | nulllabel | Display label for non-value selection.<br>Optional.<br>If not provided, nullvalue value is displayed. |

FormRadio
Standard HTML Form Radio Input

| def | Form Radio-specific Module attributes: | |
|---|---|---|
| | optionvalues | Selectable values. Format:<br>value=value1,value2,value3,value4<br>(no spaces, escaping ',' character with ,) |
| | optionlabels | Display labels for values. Optional.<br>If not provided, optionvalues values are used.<br>Format:<br>value=value1,value2,value3,value4<br>(no spaces, escaping ',' character with ,) |
| | shownull | Display (optional) non-value value<br>[t/f(default)] |
| | nullvalue | Value for optional non-value selection |
| | nulllabel | Display label for non-value selection.<br>Optional.<br>If not provided, nullvalue value is displayed. |

FormSubmit
Standard HTML Form Submit Button

| | |
|---|---|
| value | Value to display and submit for the button (default=Submit) |

FormTextArea
Standard HTML Form Textarea Input

| | |
|---|---|
| def | Form Textarea-specific Module attributes:<br>rows  Number of rows to display for the edit box<br>cols  Number of columns to display for the edit box |

FormImage (To-Be-Implemented)
Standard HTML Form Image Input
FormButton
Standard HTML Form Button Input

| | |
|---|---|
| def | Form Button-specific Module attributes:<br>buttontype  Type of button [submit(default),,reset,button]<br>buttonhtml  HTML to render for the display of the button |

FormFile (To-Be-Implemented)
Standard HTML Form File Input
FormReset
Standard HTML Form Reset Input
FormActions FormActions define how a Form Module is to be submitted to a web site upon Form submission. FormActions are defined in the def attribute for Form Modules (see above). FormActions define the method for submission [GET,POST(to-be-implemented)] and the action holding the URL to submit the form to. The type of FormAction component to be used is defined by the actiontype attribute.
FormAction FormAction implements the standard HTML Form submission of producing a GET or POST submission based on the values of the HTML Form Elements.

When the URL for the submission to the web site is created, the concatvalues attribute determines if multiple values for an Item should be concatenated together in the format:
    item1=value1,value2,value2 . . .
or if the name=value pair should be repeated for each value for the Item:
    item1=value1&item1=value2&item1=value3 . . .

The default behavior (if the concatevalues attribute is not specified) is to concatenate the values together. If the values are to be concatenated, the urlvaluedelim attribute is used as the delimiter. If not specified, the ',' character is used as the delimiter.
FormSubstitutionAction The FormSubstitutionAction substitutes values from the Form Items into the Form's action (URL) for submission. The format for the substitution is a complete URL with the names of the Items to substitute values for surrounded by '%' characters. Note that it is the name of the Form Item, not the label of the Form Item that should be used for substitution. For example:
    http://myurl.com/path/%item1% will substitute in the value for item1 directly after the final '/' character in the URL. For example, if item1=apple, the URL will be:
    http://myurl.com/path/apple If the action uses a attribute=format, the FormSubstitutionAction action would be defined as:
    http://myurl.com/path/item1=%item1%
which when substituted to be (if item1=apple):
    http://myurl.com/path/item1=apple In the case where multiple values exist for a single item (such as for a FormCheckbox, FormRadio, or FormSelectlist Form Item, the values will be concatenated together, separated by the character defined by the Item's valuedelim attribute (default ','). For example, if item1 above has two values: apple & orange, the url would be:
    http://myurl.com/path/item1=apple,orange Note that if the action URL contains the same item substitution token more than once, all occurrences of the token will be replaced by the full list of the Item's value. For example, if the action URL is defined as:
    http://myurl.com/path/
        item1=%item1=%&anotheritem1=%item1%
The substituted URL will be (where item1=apple,orange):
    http://myurl.com/path/item1=apple,
        orange&anotheritem1=apple, orange Note that for the FormSubstitutionAction Form Action (unlike for the FormAction Form Action), the concatvalues attribute does not apply (the full concatenated list of values is always used as the substituted value). However, the urlvaluedelim attribute is used when concatenating multiple values together.
Locators Locators are used to find and extract information from data sources incorporated into a Task. Locators are defined at the Module or Item that incorporates the Locator for locating and extracting text. The format for defining a Locator for a Module or Item contains the attribute type of Locator [e.g. HTMLLocator], the attribute instructions and the general def attribute for specific Locator sub-class attributes. Locators are defined as an attribute of a Module or Item:
    locator=type=<locatortype>|instructions=<instr1>:
        <instr2>|def=<attr1>=<value1>:<attr2>=<value2>
HTMLLocator Currently, only the HTMLLocator is implemented. HTMLLocators parse through an HTML Document associated with a Step to locate strings of text of interest. HTMLLocators provide the key function of extracting and displaying information from web pages. For example, if an HTML document contains the HTML:
    <body><div class="city"><b>New York</b></div>
        </body>

If an Item is searching for the city contained in the web page ('New York') located in the HTML document, the Locator definition could be defined as:
    locator=type=HTMLLocator|instructions=movetopattern=<div class="city">:readblocktext=b In the above example, when the HTMLLocator for the Item executes, it will execute the instructions in order. First it will move the HTML Document's cursor to the location starting with '<div class="city">', then it will read the text found in the HTML block surrounded by the open and close bold tags (<b> and </b>). Therefore, the text 'New York' will be read from the document and stored in the value of the Item.

It is a good practice to combine HTMLLocators at both the Module and the Item levels to best locate information in an HTML Document. The Module's HTMLLocator should be used to advance the HTML Document's cursor to the general location of the text of interest (in the above example this would be the '<div class="city">' tag. Then, the Item's HTMLLocator could be used to find the specific data item and read it.

This combination of using both a Module HTMLLocator (such as for a List Module) and an Item HTMLLocator is essential when extracting a list of values for a single Item, as is done for a List Module with iterate=true. In this case, the List's HTMLLocator locates the block of HTML containing the list of data (such as the location of the stock quotes in a document) then the individual Item HTMLLocators pluck the data values from that point on. Since the Items' HTMLLocators contain only the instructions to advance the cursor to the next column or row of data, they can be repeated over and over to extract subsequent columns and rows of data. Text extracted by an HTMLLocator is stored in the Item and can optionally have portions of it replaced by setting values for the replacepattern and replacevalue attributes. When set, all occurrences of the fixed string replacepattern will be replaced with the text of the replacevalue attribute.

HTMLLocator Instructions

HTMLLocators support the following types of instructions:

| | |
|---|---|
| Move | Used to move the cursor to a point of interest in the HTML Document |
| Read | Used to read text from the HTML Document into the Item |
| Write | Used to write fixed text to the Item during processing of instructions |
| Skip | Used to move the cursor over regions in the HTML Document |
| Document Bounding | Used to restrict instruction execution to a subset of the HTML Document |

Instructions to the Locators take for form of:

instructions=<instr1Name>[=<instr1Param>]:<instr2Name>[=<instr2Param>]

For example:

instructions=movetopattern=<div class="city">: readblocktext=b which will cause the cursor to be moved to the next occurrence of the text '<div class="city">', then read the text only (leaving out HTML formatting characters) of the following HTML bold block (surrounded by the <b> and </b> HTML tags).

Instruction parameters include the following types:

| | |
|---|---|
| pattern | a fixed string pattern, such as: <div class="city"> |
| regex | a regular expression, such as: <[dD]\s+class=['"]?[a-zA-Z]['"]?> |
| tag | an HTML tag name without the < and > enclosures, such as: div |
| attrName | an HTML tag attribute name, such as: class |
| pos | a physical position in the document, starting with 0, such as: 154 |
| num | a integer number, such as: 10 |
| mark | a name for a reference point in the HTML document, such as: city_begin |
| varName | the variable name to read values into |

[Instructions in the tables preceded by the * remain to be implemented]

Cursor Move Instructions

| | |
|---|---|
| moveToPattern( pattern ) | Move the cursor to the next match for a fixed string 'pattern' |
| moveToRegex( regex ) | Move the cursor to the next match for the regular expression 'regex' |
| moveToBlock( tag ) | Move the cursor to the HTML block starting with the next occurrence of the HTML tag 'tag'. Note that 'tag' is only the name of the HTML tag(e.g. bold) and must not include the enclosing < > characters. |
| moveToTag( tag ) | Move the cursor to the next occurrence of the HTML tag 'tag'. Note that 'tag' is only the name of the HTML tag(e.g. bold) and must not include the enclosing < > characters. |
| moveToAttribute( [attrName] ) | Move the cursor to the beginning of the named attribute, or the next attribute if attrName is null from the tag the cursor is currently on |
| moveToAttributeValue( [attrName] ) | Move the cursor to the beginning of the value of the named attribute or the value of the next attribute if attrName is null from the tag the cursor is currently on |
| moveToPos( pos ) | Move the cursor to the fixed location 'pos' in the document. Note that positions in the document start with position 0 (zero). Attempting to move the cursor to a position beyond the end of the HTML document will result in the cursor being set to the end of the document (beyond the text). Moving the cursor to −1 or to the length of the HTML document is equivalent to moving the cursor to the end of the document where no more text can be read. Attempting to move the cursor to a position to a position lower than −1 (<=−2) will result in the cursor being positioned at the first character in the document (pos=0). |
| moveToText( ) | Move the cursor to the next non-HTML markup text |
| moveToHTML( ) | Move the cursor to the next HTML markup text |
| moveToEndOfLine( ) | Move the cursor to the end of the current line |
| moveToNextLine( ) | Move the cursor to the beginning of the next line (skipping all empty lines and additional line feed and carriage return characters. Note that most move/read instructions ignore line breaks implicitly. |

-continued

| | |
|---|---|
| moveToWhitespace( ) | Move to the next occurrence of a whitespace character in the document. Whitespace includes all whitespace included in typical regular expression engines, as designated by the \s special character, including: spaces, tabs, line feeds, carriage returns, and other special whitespace characters. |
| moveToNonWhitespace( ) | Move to the next occurrence of a non-whitespace character in the document. Non-whitespace is defined as not matching the whitespace character as defined in 'moveToWhitespace( )' |
| moveToStart( ) | Move the cursor to the beginning (position 0) of the HTML document |
| moveToEnd( ) | Move the cursor to the end of the HTML document (position=length) |
| setMark( mark ) | set a named mark at the current cursor position which can be moved to in a future moveToMark instruction |
| moveToMark( mark ) | Move the cursor to a previously marked location set by the setMark( ) method |

Read Instructions

| | |
|---|---|
| *readCharacters( num ) | Read a fixed number of characters from the current position |
| *readRegex( regex ) | Read the next string of characters that match the regex |
| *readTag( tag ) | Read the entire HTML tag contents (tag + attributes) for the next occurrence of 'tag', or for the current tag if tag is null |
| *readText( ) | Read the string of characters from the current position up to the next HTML tag or the end of file (whichever comes first) |
| *readHTML( ) | Read the string of characters from the current position that are part of HTML markup up to the first occurrence of non-HTML markup characters |
| *readAttribute( [attrName] ) | Read the entire attrName=attrValue string for the 'attrName' attribute or for the next attribute from the current position if the attrName is null |
| readAttributeValue( [attrName] ) | Read only the attribute value for the 'attrName' attribute or for the next attribute from the current position if attrName is null. |
| readBlock( [tag] ) | Read the entire block for the next occurrence of the 'tag' HTML block or for the block starting with the 'tag' at the current position |
| readBlockText( [tag] ) | Read the text within block for the next occurrence of the 'tag' HTML block or for the block starting with the 'tag' at the current position |
| readToPosition( pos ) | Read from the current position to the designed position 'pos' |
| *readToEnd( ) | Read from the current position to the end of the file |
| *readToPattern( pattern ) | Read from the current position up to the character before the beginning of the string pattern |
| *readToPatternEnd( pattern ) | Read from the current position up to the final character of the string matching the string pattern |
| *readToRegex( regex ) | Read from the current position up to the character before the string matching the regular expression |
| *readToRegexEnd( regex ) | Read from the current position up to the final character of the string matching the regular expression |
| *readToTag( tag ) | Read from the current position up to the HTML tag |
| *readToText( ) | Read from the current position up to the next non-HTML text character. |
| *readToHTML( ) | Read from the current position up to the next HTML markup characters |
| setvar( varName ) | Sets the name of the variable to read the extracted information into. By default, setvar does not need to be set, reading all extracted text into the value variable. Certain Items will treat different data variables differently. For example, the Link Item extracts both a URL variable (the URL to link to) and a text variable (the text to be displayed for the Link). |

Write Instructions

| | | |
|---|---|---|
| write( text ) | write a literal value to the result buffer | 5 |

Skip Instructions

| | |
|---|---|
| *skipCharacters( num ) | Skip over a fixed number of characters |
| *skipPattern( pattern ) | Skip over the next string of characters that match the pattern (plus any characters preceding that match) |
| *skipRegex( regex ) | Skip over the next string of characters that match the regular expression (plus any characters preceding that match) |
| *skipBlock( [tag] ) | Skip over the entire block of HTML starting with the next block of HTML tag 'tag', or starting with the block of the HTML tag found at the current position in the file. |
| *skipTag( [tag] ) | Skip over the entire HTML tag (tag+attributes) for the next occurrence of the tag 'tag' in the file, or if null, over the tag at the current position in the file |
| *skipAttribute( [attrName] ) | Skip over the attribute 'attrName' or over the next attribute found from the current position in the file |
| *skipText( ) | Skip over the text found at the current position in the file leaving the cursor at the next occurrence of HTML markup text |
| *skipHTML( ) | Skip over the HTML found at the current position in the file leaving the cursor at the next occurrence of text |

Document Bounding Instructions

| | |
|---|---|
| *setHTMLStartAtCurrentPosition( ) | Set the file start at the current position |
| *setHTMLStartAtPosition( pos ) | Set the file start at the position 'pos' in the file |
| *setHTMLStartAtPattern( pattern ) | Set the file start position at the first character of the next occurrence of the pattern 'pattern' found from the current position in the file |
| *setHTMLStartAtRegex( regex ) | Set the file start position at the first character of the next occurrence of the regular expression 'regex' found from the current position in the file |
| *setHTMLStartAtTag( tag ) | Set the file start position at the first character of the next occurrence of the tag 'tag' or at the tag at the current position in the file if 'tag' is null |
| *setHTMLStartAtText( ) | Set the file start position at the next occurrence of non-HTML text |
| *setHTMLStartAtHTML( ) | Set the file start position at the next occurrence of HTML markup text |
| *setHTMLStartAfterPattern( pattern ) | Set the file start position at the character following the next occurrence of the pattern 'pattern' found from the current position in the file |
| *setHTMLStartAfterRegex( regex ) | Set the file start position at the character following the next occurrence of the regular expression 'regex' found from the current position in the file |
| *setHTMLStartAfterTag( tag ) | Set the file start position at the character following the next occurrence of the tag 'tag' or at the tag at the current position in the file if 'tag' is null |
| *resetHTMLStart( ) | Reset the start position of the HTML file to the previous start. Note that this may not be the actual start of the file if a previously executing Locator has moved the start down. This will, however, be transparent to the Locator and is managed by the HTML object |
| *setHTMLEndAtCurrentPosition( ) | Set the file end at the current position of the cursor in the file |
| *setHTMLEndAtPosition( pos ) | Set the file end at the file position 'pos' |
| *setHTMLEndAtPattern( pattern ) | Set the file end position at the first character of the next occurrence of the match for the pattern 'pattern' |
| *setHTMLEndAtRegex( regex ) | Set the file end position at the first character of the next occurrence of the match for the regular expression 'regex' |
| *setHTMLEndAtTag( tag ) | Set the file end position at the first character of the next occurrence of the HTML tag 'tag' |
| *setHTMLEndAtBlock( tag ) | Set the file end position at the end of the next occurrence of the block for tag 'tag', or at the end of the block found at the current position in the file |
| *setHTMLEndAtText( ) | Set the file end position at the next occurrence of non-HTML text |

| | |
|---|---|
| *setHTMLEndAtHTML( ) | Set the file end position at the next occurrence of HTML markup text |
| *setHTMLEndAfterPattern( pattern ) | Set the file end position at the character following the final character in the string that matches the next occurrence for the pattern 'pattern' |
| *setHTMLEndAfterRegex( regex ) | Set the file end position at the character following the final character in the string that matches the next occurrence for the regular expression 'regex' |
| *resetHTMLEnd( ) | Reset the end position of the HTML file to the previous end Note that this may not be the actual end of the file if a previously executing Locator has moved the end up. This will, however, be transparent to the Locator and is managed by the HTML object |

Configuration Files (Task Workflow Templates)
Format
   Configuration Files take the following format:
   [ObjectType]
   attr=value[|value]
   [ObjectType]
   attr-value[|value]
where ObjectType is: Task, Step, Module, or Item. The '|' character designates the break between multiple values for an attribute. Where the character '|' exists in the value itself, the escape sequence: &bar; should be substituted for the '|' character. The escape sequence will be replaced when the attribute is loaded.
   For attributes that define a sub-list of attribute-value pairs (such as for the def attribute), the format is:
   attr=sub-attr1=value1|sub-attr2=value2|sub-attr3=value3
   Each line of the Configuration File must be terminated by the ascii linefeed (newline) character (ascii value: 10). The ascii carriage return character (ascii value: 13) can optionally be present in combination with the linefeed character at the termination of lines, either before or after the linefeed character.
   Values that contain either the linefeed or carriage return characters must escape the characters with: \n for linefeeds and \r for carriage returns. For example:
   attr=linefeed right here\n followed by a carriage return here\r
   Linefeed and carriage return escape sequences will be replaced when the Configuration File is loaded.
   Note that the final line in the Configuration File must be terminated by a linefeed character.

EXAMPLES

Stock Quotes

```
[task]
id=1
name=yahoo_finance
label=Yahoo Finance
lastupdated=2009-04-24 21:11:52.0
def=
executeonopen=1
[step]
id=1.1
type=HTMLStep
name=quote_search
label=Quote Search
taskid=1
def=url=http://finance.yahoo.com|loadhtml=0
[module]
id=1.1.1
type=Form
stepid=1.1
name=quote_form
label=Quote Form
def=action=http://finance.yahoo.com/q/cq?d=v1|method=get
executeonopen=1
locator=type=HTMLLocator|instructions=movetopattern=<form id=\"searchQuotes\"
nextstepid=1.2
[item]
id=1.1.1.1
type=FormText
name=s
label=Symbol
moduleid=1.1.1
def=
[item]
id=1.1.1.2
type=FormSubmit
name=get_quotes
label=Get Quotes
moduleid=1.1.1
def=
value=Submit
[step]
id=1.2
type=HTMLStep
name=quote_results
label=Quotes
taskid=1
def=
[module]
id=1.2.1
type=List
stepid=1.2
name=quote_form
label=Quote Form
def=iterated=1
locator=type=HTMLLocator|instructions=movetopattern=<table border=\"0\" cellpadding=\"3\" cellspacing=\"0\" width=\"100%\" class=\"yfnc_modtitle1\"><tr><td><b><big>Basic </big>
[item]
id=1.2.1.1
type=HTMLItem
name=symbol
label=Symbol
moduleid=1.2.1
def=
```

```
locator=type=HTMLLocator|instructions=movetopattern=
<tr><td class=\"yfnc_tabledata1\" nowrap align=\"cen-
ter\">:readblocktext=a
[item]
id=1.2.1.2
type=HTMLItem
name=time
label=Time
moduleid=1.2.1
def=
locator=type=HTMLLocator|instructions=readblocktext=
span
[item]
id=1.2.1.3
type=HTMLItem
name=quote
label=Quote
moduleid=1.2.1
def=
locator=type=HTMLLocator|instructions=readblocktext=
span
Movie Listings
[task]
id=2
name=yahoo_movies
label=Yahoo Movies
lastupdated=2009-04-24 21:11:53.0
[step]
id=2.1
type=HTMLStep
name=movie_listing
label=Top 10 Movies
taskid=2
def=url=http://movies.yahoo.com
[module]
id=2.1.1
type=List
stepid=2.1
name=movies_list
label=Movies
nextstepid=2.2
def=iterated=1
locator=type=HTMLLocator|instructions=movetopattern=
<h3>Top Box Office</h3>:movetotag=ol
[item]
id=2.1.1.1
type=Link
name=title
label=Title
moduleid=2.1.1
def=
locator=type=HTMLLocator|def=valuedelimtoken=
|instructions=movetotag=li:movetotag=a
[step]
id=2.2
type=HTMLStep
name=movie_details
label=Movie Details
taskid=2
def=
locator=pattern=<h3>Top Box Office</h3>|type=HTML-
Locator
[module]
id=2.2.1
stepid=2.2
type=Display
name=movie_info
label=Movie Info
[item]
id=2.2.1.0
type=HTMLItem
name=title
label=Title:
moduleid=2.2.1
def=
locator=type=HTMLLocator|instructions=readblocktext=
title
[item]
id=2.2.1.1
type=HTMLItem
name=critics
label=Critics Rating:
moduleid=2.2.1
def=
locator=type=HTMLLocator|instructions=movetopattern=
<b class=\"movie-critics_rating\">:readblocktext
[item]
id=2.2.1.2
type=HTMLItem
name=users
label=Users Rating:
moduleid=2.2.1
def=
locator=type=HTMLLocator|instructions=movetopattern=
<b class=\"movie-users_rating\">:readblocktext
[item]
id=2.2.1.3
type=HTMLItem
name=summary
label=Summary
moduleid=2.2.1
def=
    locator=type=HTMLLocator|instructions=movetopat-
       tern=<font face=
```

What is claimed is:

1. A process for processing one or more web pages, comprising:
   A) fetching a task workflow template;
   B) executing the instructions in a step of said task workflow template using a microbrowser so as to retrieve HTML or XHTML document(s) of a web page specified by said step in said task workflow template;
   C) searching for specific desired information in said HTML or XHTML document where each piece of information sought is specified in a module in said step, where each module contains one or more items that extracts and displays a single display item, form element or conditional expression, each said module and item containing locators which are parsers that take instruction on how to parse through the HTML or XHTML document specified in the step and extract the desired data and where each said locator is the means by which items extract the content the item in intended to extract and render it for display, and wherein each said locator searches through said HTML or XHTML document either by searching for specific HTML or XHTML tags which enclose said specific desired information said HTML or XHTML tags being specified in said task workflow template, by use of regular expressions or searching by string matching or searching by location of said specific desired information in said HTML or XHTML document, and extracting only said specific desired information and, in the case the desired information is a form element, also extracting said HTML tags or said XHTML tags which enclose said desired information from each of said web pages which is specified in said task workflow template; and D) displaying on a computer executing said microbrowser only said desired information extracted from said one or more web pages by inputting said extracted desired information and any HTML or XHTML tags extracted with it to a browser which renders said desired information as a human readable display.

2. A process for processing a plurality of web, pages comprising:

A) fetching a task workflow template from local storage on a computer programmed with a microbrowser;

B) controlling execution of said computer using said microbrowser to execute instructions which are part of a first step module which is part of said task workflow template fetched in step A so as to identify a specific web page and cause said computer to retrieve and store the HTML or XHTML document of said web page identified in said step module;

C) extracting one or more elements from said HTML or XHTML document including a form element that requires a user of said computer to enter information to fill in said form;

D) displaying said form element extracted from said web page on a display of said computer executing said microbrowser;

E) receiving user input entered by a user via one or more input devices of said computer executing said microbrowser;

F) sending said information entered by said user to a server on the internet which supplied the HTML document fetched in step B;

G) controlling execution of said computer using said microbrowser to execute instructions which are part of a second step module which is part of said task workflow template fetched in step A so as to identify a second web page which is generated by said server to which said user information was sent in step F, said second web page being generated by said server in response to receiving said user information and cause said computer to retrieve and store the HTML document of said second web page identified in said step module;

H) controlling execution of said computer using said microbrowser to execute instructions which are part of one or more list, form and/or item modules which are part of said second step module to extract only the information from said HTML document of said second web page which is specified in said list, form and/or item modules; and I) displaying on said computer executing said microbrowser only the information extracted from said second web page.

3. The process of claim 2 further comprising the step of, before step A, displaying a task list of the task workflows templates that are stored locally on the computer using said microbrowser and receiving user input selecting one of said task workflow templates for execution, and wherein step A comprises fetching said task workflow template selected by said user.

4. The process of claim 3 further comprising the step of, after receiving said user input selecting said task workflow template, fetching at least the version number of said task workflow template and checking said version number against the version number of the task workflow template designed to accomplish the same task and stored on a template server, and if the task workflow template stored locally on said computer executing said microbrowser indicates said task workflow template said user selected is obsolete, downloading the latest version of said task workflow template stored on said template server.

5. A computer apparatus comprising:

a cell phone computer or laptop computer or desktop computer having a processor connected by a bus to main memory and non volatile storage and a display and one or more input devices if said display is not itself a touchscreen and the only input device needed, said bus also coupling said processor to a communication interface including one or more radio frequency transmission and reception circuits, modulator circuits and, if said computer is a cell phone computer or a laptop using a cellular system broadband access card for internet access, cellular data communication protocol software that controls said processor to carry out a data transport protocol for a cellular system data path used by said cell phone to communicate with servers on the internet;

said processor being programmed with software comprising an operating system kernel, a storage input/output driver, drivers for said display and one or more input devices if said other input devices work, a microbrowser and a TCP/IP protocol stack and said cellular data communication protocol software if said computer is a cell phone, said software controlling said processor to carry out the following process:

A) fetching a task workflow template from local storage on a computer programmed with a microbrowser;

B) controlling execution of said computer using said microbrowser to execute instructions which are part of a first step module which is part of said task workflow template fetched in step A so as to identify a specific web page and cause said computer to retrieve and store the HTML or XHTML document of said web page identified in said step module;

C) extracting one or more elements from said HTML or XHTML document including a form element that requires a user of said computer to enter information to fill in said form;

D) displaying said form element extracted from said web page on a display of said computer executing said microbrowser;

E) receiving user input entered by a user via one or input devices of said computer executing said microbrowser;

F) sending said information entered by said user to a server on the internet which supplied the HTML or XHTML document fetched in step B;

G) controlling execution of said computer using said microbrowser to execute instructions which are part of a second step module which is part of said task workflow template fetched in step A so as to identify a second web page which is generated by said server to which said user information was sent in step F, said second web page being generated by said server in response to receiving said user information and cause said computer to retrieve and store the HTML or XHTML document of said second web page identified in said step module;

H) controlling execution of said computer using said microbrowser to execute instructions which are part of one or more list, form and/or item modules which are part of said second step module to extract only the information from said HTML or XHTML document of said second web page which is specified in said list, form and/or item modules; and I) displaying on said computer executing said microbrowser only the information extracted from said second web page.

6. The apparatus of claim 5 wherein said software is structured to control said processor to perform the following additional steps before step A:
   loading a list of task workflow templates;
   displaying on said display of said computer said list of task workflow templates;
   receiving user input selecting one of said task workflow templates for execution; and
   checking a version number of said task workflow template selected by said user against the version number of a task workflow template stored on a template server to do the same task, and if the task workflow template stored on said computer executing said microbrowser is obsolete, downloading the task workflow template from said template server and storing and executing said task workflow template downloaded from said template server.

7. The apparatus of claim 6 wherein said software is structured to control said processor to perform the steps of the recited process in the following way:
   step A is performed by fetching a stock quote task workflow template from local storage of said computer or from a template server on the internet;
   step B is performed by controlling said computer to fetch the HTML or XHTML document of a web page which provides stock quotes;
   step C is performed by searching to locate in said HTML or XHTML document tags which are described in said first step module, said tags enclosing a form element for a form which is displayed on said web page which provide stock quotes and provides a place for a user of said web page to enter ticker symbols for stocks for which said user is interested in obtaining a quote, and wherein step C is also performed by searching in said HTML or XHTML document for tags which are described in said first step module which enclose a form element which is displayed on said web page which provides stock quotes to allow a user to select a displayed icon in order to give a submit command to request the quotes after the user is done entering ticker symbols, and wherein step C extracts and stores the form elements so located;
   step D is performed by displaying said form element to enter ticker symbols and said form element to give said submit command to on the display of said computer which is executing said microbrowser;
   step E is performed by receiving user input as to the ticker symbols for the stock of interest and the submit command;
   step F is performed by sending a request for stock quotes for the stocks having the ticker symbols entered by the user to the server which supplied the HTML or XHTML document fetched in step B;
   step G is performed by executing instructions of said second step module to cause said computer to fetch the HTML or XHTML document for the web page which said server contacted in step F responds with after receiving the ticker symbols for the stocks for which said stock quotes are desired;
   step H is performed by searching to locate in said HTML or XHTML document tags which are described in said second step module which enclose elements which are the ticker symbols of the one or more stocks for which stock quotes were requested and extracting and storing those symbols, and wherein step H is further performed by searching to locate in said HTML or XHTML document tags which are described in said second step module which enclose elements which are the prices of the one or more stocks for which stock quotes were detected and extracting and storing said prices; and
   step I is performed by displaying on the display of the computer executing said microbrowser the ticker symbol and price information extracted in the next previous step.

8. A template server apparatus comprising:
   a server computer;
   software controlling said server computer including an operating system, transport protocol software for communication on the internet, driver software and a microbrowser structured to control said server computer in accordance with the instructions in a task workflow template;
   and wherein said microbrowser is structured to control said template server to carry out the following process;
   A) receive login information from said client computer, said login information identifying a user of said client computer;
   B) authenticating said user of said client computer;
   C) if said user is not authenticated, waiting for login information from a user who is authentic;
   D) if said user is authenticated, opening a configuration file for the user and locating a list of task workflow templates this user may access;
   E) creating a web page containing said list of task workflow templates and sending said web page to said client computer for display;
   F) receiving a request from a user of said client computer requesting execution by said template server of a task workflow template identified by said user;
   G) fetching the task workflow template identified by the user and loading it into memory for execution by said template server;
   H) executing a microbrowser on said template server using said task workflow template to guide processing to fetch the HTML or XHTML documents or one or more web pages identified in said task workflow template;
   I) searching the fetched HTML or XHTML documents of said one or more web pages identified in said task workflow template to find and extract information identified in said task workflow template;
   J) creating one or more web pages using said extracted information and sending them to said client computer for display by a browser executing on said client computer;
   K) determine if any user input form data has been received from said client computer as a result of said extracted data sent to said client computer displaying a form on a display of said client computer which required user input entered on said client computer to fill out said form or if preset data exists in said task workflow template to fill in blanks on said form;
   L) if user input form data has been received from said client computer or if preset data exists to fill in blanks in said form, sending said user input form data or said preset data to the server coupled to said internet which supplies the web page from which the form displayed by said client computer was extracted;
   M) fetching the HTML or XHTML document of any web page identified in said task workflow template which results from sending, in step L, of said user input form data back to said server which supplied the web page from which the form was extracted;

N) extracting any data from said HTML or XHTML document fetched in step M which is identified in said task workflow template;

O) storing any data extracted in step N in a web pages and sending it to said client computer for display by a browser executing on said client computer;

P) repeating steps K through O until step K determines that no user input form data has been received from said client computer or no preset data exists to fill in a form such that the user of the client computer is done interacting so as to request web pages which result from supplying of data;

Q) after step K determines that no user input form data has been received from said client computer, determining if any further web pages are identified in said task workflow template which need to be processed;

R) if further web pages are identified in said task workflow template to be processed, repeating steps K through O until processing reaches step Q again and step Q determines that no further web pages are identified in said task workflow template that need to be processed and ending processing of said task workflow template.

9. A client computer apparatus, which can be a cell phone, laptop or desktop computer, comprising:

a cell phone, laptop or desktop computer programmed with software comprising an operating system, a browser, driver software, transport protocol software and other software which are capable of controlling said cell phone, laptop or desktop computer to communicate with one or more servers on the internet through the data path of a cellular phone service provider and/or the internet through an internet service provider; and a template server control program which cooperates with said software to control said cell phone, laptop or desktop computer to communicate with a template server coupled to said internet to cause said template server to execute user specified task workflow templates using a microbrowser to extract from one or more web pages and send said extracted to said cell phone, laptop or desktop computer for display using said browser;

and wherein said template server control program is structured to control said cell phone, laptop or desktop computer to perform the following process:

A) display an icon or menu command or some other user interface tool which can be invoked to cause said template server control program to launch into execution on said cell phone, laptop or desktop computer (hereafter simply referred to as the client computer);

B) displaying on a display of said client computer a login form for a user of said client computer to enter user name and password for the user's account on said template server;

C) receiving user name and password entered by a user of said client computer and sending said user name and password to said template server;

D) receiving from said template server a web page which includes a list of the task workflow templates this user can cause said template server to execute;

E) receive user input selecting a task workflow template for execution by said template server and sending said selection data to said template server;

F) receiving one or more web pages from said template server containing data extracted by said template server from one or more web pages identified in said task workflow template identified by said user of said client computer and sent to said template server in step E, said extracted data in said web pages being data identified in said task workflow template;

G) displaying on said client computer the extracted data contained in said web pages received from said template server;

H) determining if any of said displayed data is a form element and determining whether user input form data has been entered in said form element or preset data has been fetched to fill in said form element, and receiving said user input form data filled in by said user of said client computer or said fetched preset data used to fill in said form element, and sending at least said user input form data or said fetched preset data to said template server;

I) repeating steps F and G and H until step H determines that no further user input form data has been entered or no further preset data exists to be sent to said template server.

* * * * *